(12) United States Patent
Quraishi et al.

(10) Patent No.: US 11,781,061 B2
(45) Date of Patent: Oct. 10, 2023

(54) CORROSION PROTECTION METHOD FOR WELLBORE PIPING

(71) Applicant: King Fahd University of Petroleum and Minerals, Dhahran (SA)

(72) Inventors: Mumtaz Ahmad Quraishi, Dhahran (SA); Kashif Rahmani Ansari, Dhahran (SA); Dheeraj Singh Chauhan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/938,340

(22) Filed: Oct. 6, 2022

(65) Prior Publication Data

US 2023/0048387 A1 Feb. 16, 2023

Related U.S. Application Data

(62) Division of application No. 16/418,585, filed on May 21, 2019, now Pat. No. 11,518,932.

(51) Int. Cl.
| | |
|---|---|
| *E21B 43/26* | (2006.01) |
| *C09K 8/74* | (2006.01) |
| *C09K 8/54* | (2006.01) |
| *E21B 4/02* | (2006.01) |

(52) U.S. Cl.
CPC ............. *C09K 8/74* (2013.01); *C09K 8/54* (2013.01); *E21B 4/02* (2013.01); *E21B 43/26* (2013.01); *C09K 2208/32* (2013.01)

(58) Field of Classification Search
CPC ........ C09K 8/74; C09K 8/54; C09K 2208/32; E21B 41/02
See application file for complete search history.

(56) References Cited

U.S. PATENT DOCUMENTS

| 7,906,462 B2 | 3/2011 | Mesher et al. | |
|---|---|---|---|
| 2006/0196666 A1 | 9/2006 | Al-Taq | |
| 2008/0314594 A1 | 12/2008 | Still | |
| 2012/0157354 A1 | 6/2012 | Li | |
| 2013/0112106 A1* | 5/2013 | Malwitz | C09K 8/54 106/14.44 |
| 2014/0190692 A1* | 7/2014 | Hibbeler | C09K 8/60 166/308.4 |
| 2016/0046796 A1* | 2/2016 | Krasnow | C09D 5/082 524/355 |
| 2017/0240796 A1* | 8/2017 | Barmatov | C23C 22/73 |

FOREIGN PATENT DOCUMENTS

| IN | 194582 | 11/2004 |
|---|---|---|
| WO | WO 2018/186827 A1 | 10/2018 |

OTHER PUBLICATIONS

Priya, et al.; Development of Novel Acidizing Inhibitors for Carbon Steel Corrosion in 15% Boiling Hydrochloric Acid; Corrosion—vol. 64, No. 6; Jun. 2008; pp. 541-552; 12 Pages.
Ahamad, et al.; An experimental and theoretical investigation of adsorption characteristics of a Schiff base compound as corrosion inhibitor at mild steel/hydrochloric acid interface; Journal of Applied Electrochemistry, vol. 40, Issue 12; pp. 2171-2183; Dec. 2010; Abstract Only; 1 Page.
Mohan, et al.; Inhibition Effect of Benzohydrazide Derivatives on Corrosion Behaviour of Mild Steel in 1 M HCl; Hindawi Publishing Corporation; Journal of Chemistry, vol. 2013; Article ID 541691; Jun. 6, 2012; 8 Pages.
Ansari, et al.; Experimental and quantum chemical evaluation of Schiff bases of isatin as a new and green corrosion inhibitors for mild steel in 20% H2SO4; Journal of the Taiwan Institute of Chemical Engineers 54; pp. 145-154; Apr. 23, 2015; 10 Pages.
Quraishi, et al.; Dianils: New and Effective Corrosion Inhibitors for Oil-Well Steel (N-80) and Mild Steel in Boiling Hydrochloric Acid; Corrosion Science Section—vol. 56, No. 2; Sep. 1999; 5 Pages; pp. 156-160.

(Continued)

*Primary Examiner* — Silvana C Runyan
(74) *Attorney, Agent, or Firm* — Oblon, McClelland, Maier & Neustadt, L.L.P.

(57) ABSTRACT

A method of inhibiting corrosion of metal during acid stimulation of an oil and gas well is provided. The method includes treating the oil and gas well with an acidic treatment fluid containing an acid, a corrosion inhibitor of formula I,

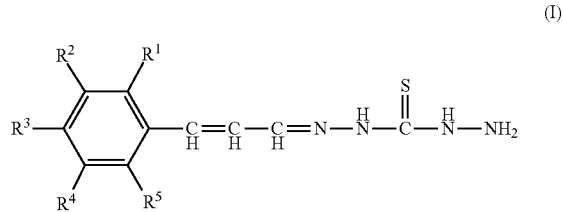

(I)

wherein $R^1$ to $R^5$ are hydrogen, and a secondary corrosion inhibitor of formula (II)

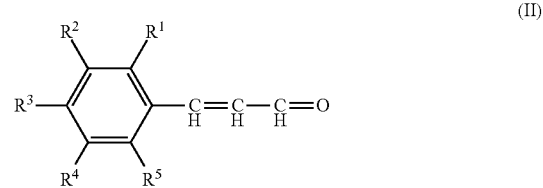

(II)

wherein $R^1$ to $R^5$ are independently hydrogen, an alkyl, an aryl, or an alkoxy, The treatment fluid is substantially free of an intensifier, a surfactant, an organic solvent and a dimeric reaction product obtained by a double condensation reaction between thiocarbohydrazide ($H_2N$—$NH$—$C(S)$—$NH$—$NH_2$) and two cinnamaldehyde compounds.

13 Claims, 13 Drawing Sheets

(56) References Cited

OTHER PUBLICATIONS

Quraishi, et al. ; Fatty Acid Triazoles: Novel Corrosion Inhibitors for Oil Well Steel (N-80) and Mild Steel ; JAOCS vol. 77, No. 10 ; 2000 ; 5 Pages.
Quraishi, et al. ; A Study of Some New Acidizing Inhibitors on Corrosion of N-80 Alloy in 15% Boiling Hydrochloric Acid ; Corrosion vol. 58, Issue 4 ; pp. 317-321 ; Oct. 2001 ; 5 Pages.

* cited by examiner

Optimized Structure  HOMO  LUMO

Optimized Structure     HOMO     LUMO

Optimized Structure      HOMO      LUMO

CORROSION PROTECTION METHOD FOR WELLBORE PIPING

CROSS-REFERENCE TO RELATED APPLICATIONS

The present application is a Divisional of U.S. application Ser. No. 16/418,585, pending, having a filing date of May 21, 2019.

BACKGROUND OF THE INVENTION

Field of the Invention

The present invention relates to methods of inhibiting corrosion of metal during acid stimulation operations with acidic treatment fluids.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Acidizing is an important technique in oil and gas drilling operations for enhancing oil production. In this process, highly acidic acids (e.g., 15% HCl) are forced into the pore spaces of the rock formation which dissolves calcite, limestone, and dolomite and enlarges the existing flow channels to facilitate the oil production. See M. Finsgar, J. Jackson, Application of corrosion inhibitors for steels in acidic media for the oil and gas industry: A review, Corr. Sci. 86, 2014, 17; U.S. Pat. Nos. 4,552,672; 5,209,859; A. Singh, M. A. Acidizing Corrosion Inhibitors: A Review, Sci. 6, 2015, 224; J. C. Cowan, D. J. Weintritt, Water Formed Scale Deposit, Gulf Publishing Co. Houston, Texas 1976; D. J. Weintritt, Criteria for scale and corrosion Pet. Eng. Intl. 1980, 44; A. J. Essel, B. L. Carlberg, Strontium sulfate scale control by inhibitor squeeze treatment in the Fateh field, J. Pet. Technol. 34, 1982, 1302; S. D Harms, J. M. Smith, G. E. King, K. Posey. Permian Basin Oil and Gas Recovery Conference Midland, Texas, 1988; and O. J. Vetter, Oilfield scale—Can we handle it?, J. Pet. Technol. 28, 1976, 1402—each incorporated herein by reference in their entirety. Besides HCl, other acids like HF, acetic acid, and formic acid are used depending upon the composition of rocks and depth of the well. One benefit of using HCl is that it forms soluble chlorides. See M. A. Quraishi, J. Danish, Dianils: New and Effective Corrosion Inhibitors for Oil-Well Steel (N-80) and Mild Steel in Boiling Hydrochloric Acid, Corrosion 56, 2000, 156; G. Schmitt, Application of Inhibitors for Acid Media: Report prepared for the European Federation of Corrosion Working Party on Inhibitors, Br. Corr. J. 19, 1984, 165; A. Cizek, Acidizing Inhibitors, Mater. Perform. 33, 1994, 56; M. A. Quraishi, N. Sardar, H. Ali, A Study of Some New Acidizing Inhibitors on Corrosion of N-80 Alloy in 15% Boiling Hydrochloric Acid, 58, 2002, 317; C. F. Smith, F. E. Dollarhide, N. B. Byth, Acid corrosion inhibitor: are we getting what we need?, J Petrol. Technol. 30, 1978, 737—each incorporated herein by reference in their entirety.

In order to minimize the corrosion of tubular steel, organic inhibitors are frequently used. See M. Finsgar, J. Jackson, Application of corrosion inhibitors for steels in acidic media for the oil and gas industry: A review, Corr. Sci. 86, 2014, 17; G. Schmitt, Application of Inhibitors for Acid Media: Report prepared for the European Federation of Corrosion Working Party on Inhibitors, Br. Corr. J. 19, 1984, 165; and M. Quraishi, D. Jamal, Fatty acid triazoles: Novel corrosion inhibitors for oil well steel (N-80) and mild steel, J. Am. Oil Chem. Soc. 77, 2000, 1107—each incorporated herein by reference in their entirety. The effective acidizing inhibitors that are usually found in commercial formulations are acetylenic alcohols, alkenyl phenones, aromatic aldehydes, nitrogen-containing heterocycles and their quaternary salts, and condensation products of carbonyl compounds and amines. See U.S. Pat. Nos. 4,302,246; 4,263,167; I. L. Rosenfeld. Corrosion Inhibitors (New York. NY; McGraw-Hill 1981). p. 98; W. W. Frenier. F. B. Growcock. V. R Lopp. α-Alkenylphenones—A New Class of Acid Corrosion Inhibitors, Corrosion 44, 1988, 590; F. B. Growcock. W. W. Frenier. P. A. Andreozzi. Inhibition of Steel Corrosion in HCl by Derivatives of Cinnamaldehyde: Part II. Structure—Activity Correlations, Corrosion 45, 1989, 1007; U.S. Pat. Nos. 4,997,040; 3,982,894; K. D. Neemla. A. Jayaraman. R. C. Saxena. A. K. Agarwal. R Krishna. Corrosion inhibitor studies on oil well tubular steels in hydrochloric acid, Bull. Electrochem. 5, 1989, 250; U.S. Pat. No. 3,077,454—each incorporated herein by reference in their entirety. These inhibitors contain heteroatoms like N, S, and O and multiple bonds through they are adsorbed and inhibit corrosion.

The survey of literature reveals that single components are not effective. See M. Finsgar, J. Jackson, Application of corrosion inhibitors for steels in acidic media for the oil and gas industry: A review, Corr. Sci. 86, 2014, 17; G. Schmitt, Application of Inhibitors for Acid Media: Report prepared for the European Federation of Corrosion Working Party on Inhibitors, Br. Corr. J. 19, 1984, 165—each incorporated herein by reference in its entirety. Therefore, formulations are used in practice almost exclusively. However, there are of course associated costs with using multi-component formulations.

In view of the forgoing, there is a need for corrosion inhibitors that can be used either alone, or in corrosion inhibiting formulations, and at low concentrations for preventing corrosion of metal in various oil and gas field environments, including high temperature and highly acidic conditions common to acid stimulation operations.

SUMMARY OF THE INVENTION

Accordingly, it is one object of the present invention to provide novel methods of inhibiting corrosion of metal during acid stimulation of an oil and gas well using acidic treatment fluids containing high concentrations of acids and low concentrations of a corrosion inhibitor obtainable from a condensation reaction between thiocarbohydrazide and a cinnamaldehyde compound.

Thus, the present invention provides:

A method of inhibiting corrosion of metal during acid stimulation of an oil and gas well, the method involving treating the oil and gas well with an acidic treatment fluid comprising 10 to 28 wt. % of an acid and 0.001 to 0.045 wt. % of a corrosion inhibitor of formula I, each based on a total weight of the acidic treatment fluid,

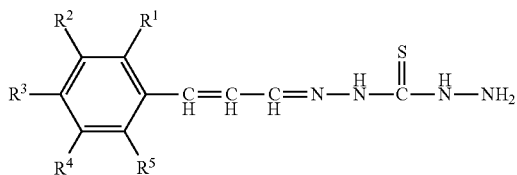

(I)

wherein $R^1$ to $R^5$ are independently hydrogen, an optionally substituted alkyl, an optionally substituted aryl, an optionally substituted alkoxy, an optionally substituted alkanoyloxy, a carboxy, an optionally substituted alkoxycarbonyl, a hydroxy, a halo, a nitro, a cyano, or wherein two of these adjacent substituents represented by $R^1$ to $R^5$, together form a methylene dioxy group.

In some embodiments, $R^1$ to $R^5$ are independently hydrogen, an alkyl, an aryl, or an alkoxy.

In some embodiments, $R^1$ to $R^5$ are each hydrogen.

In some embodiments, at least one of $R^1$ to $R^5$ is an alkyl having 6 to 18 carbon atoms.

In some embodiments, at least one of $R^1$ to $R^5$ is an alkoxy.

In some embodiments, the corrosion inhibitor of formula I is present in the acidic treatment fluid in a concentration of 0.002 to 0.005 wt. %, based on a total weight of the acidic treatment fluid.

In some embodiments, the acidic treatment fluid consists of the acid and the corrosion inhibitor of formula I in water or the acidic treatment fluid consists of the acid and the corrosion inhibitor of formula I in an oil-in-water emulsion.

In some embodiments, the acidic treatment fluid further contains at least one secondary corrosion inhibitor selected from the group consisting of a cinnamaldehyde compound, an alkoxylated fatty amine, and an imidazoline compound.

In some embodiments, the acidic treatment fluid further contains 0.001 to 0.5 wt. % of an intensifier, based on a total weight of the acidic treatment fluid, wherein the intensifier is at least one selected from the group consisting of CuI, KI, NaCl, and formic acid.

In some embodiments, the acidic treatment fluid further contains 0.001 to 0.5 wt. % of a surfactant, based on a total weight of the acidic treatment fluid.

In some embodiments, the surfactant is sodium dodecyl sulfate.

In some embodiments, the acidic treatment fluid further contains 5 to 20 vol. % of an organic solvent, based on a total volume of the acidic treatment fluid, and wherein the organic solvent is at least one selected from the group consisting of acetone, methyl ethyl ketone, methanol, ethanol, propanol, isopropanol, n-butanol, isobutanol, ethylene glycol, and diethylene glycol.

In some embodiments, the acidic treatment fluid is substantially free of an intensifier, a surfactant, and an organic solvent.

In some embodiments, the acidic treatment fluid is an aqueous solution.

In some embodiments, the acidic treatment fluid is an oil-in-water emulsion.

In some embodiments, the acid is HCl and wherein the acidic treatment fluid contains 14 to 16 wt. % HCl, based on a total weight of the acidic treatment fluid.

In some embodiments, the oil and gas well is treated with the acidic treatment fluid at a temperature of 25 to 180° C.

In some embodiments, the metal is carbon steel.

In some embodiments, the method provides a corrosion inhibition efficiency of 80 to 99.5%.

In some embodiments, the method provides a corrosion rate of the metal of from 16 to 100 millimeters per year (mm/y) when exposed to 15 wt. % of the acid at 90° C.

In some embodiments, the acidic treatment fluid is formed downhole by injecting the acid into the oil and gas well, followed by injecting the corrosion inhibitor of formula I into the oil and gas well.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
FIG. 1 illustrates the molecular structure of inhibitor N'-(3-phenylallylidene)-hydrazinecarbothiohydrazide (PHCT)

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly)oxybutylene (derived from butylene oxide. BO), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 2 to 24, preferably 3 to 22, preferably 4 to 20, preferably 5 to 18, preferably 6 to 16, preferably 7 to 14, preferably 8 to 12, preferably 9 to 10. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" or "heteroaryl" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, furan, benzofuran, thiophene, benzothiophene, isoxazole, pyrazole, triazole, tetrazole, indazole, purine, carbazole, imidazole, and benzimidazole.

As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)-Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may be selected from aryl, alkoxy, aryloxy, arylalkyloxy, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, —CONHalkyl, —CONHaryl, —CONHarylalkyl or cases where there are two substituents on one nitrogen), and the like.

As used herein the term "corrosion inhibitor" refers to a substance(s) that prevents or reduces the deterioration of a metal surface by oxidation or other chemical reaction. Corrosive substances that can cause corrosion, particularly of metal surfaces of equipment used during stimulation operations, include water with high salt contents, acidic inorganic compounds such as hydrochloric acid, hydrofluoric acid, carbon dioxide ($CO_2$) and/or hydrogen sulfide ($H_2S$), organic acids, and microorganisms. Preferred corrosion inhibitors of the present invention reduce, inhibit and/or prevent the destructive effect such substances have on various metal surfaces.

As used herein, the phrase "acid stimulation" or "acidizing" refers to the general process of introducing an acidic fluid downhole to perform at least one of the following functions: (1) to react with and to dissolve the area surrounding the well which has been damaged; (2) to react with and to dissolve rock associated with the geological formation to create small conducting channels (e.g., conducting wormholes) through which the hydrocarbon will flow; and (3) to create a large flow channel by injecting acidic fluids through the well at pressures sufficient to fracture the rock, thus allowing the hydrocarbon to migrate rapidly from the rock to the well. Thus, "acid stimulation" or "acidizing" may refer to either or both matrix acidizing and fracture acidizing treatments.

Methods of Inhibiting Corrosion

Petroleum oil and natural gas wells are typically subjected to numerous chemical treatments during their production life to enhance operation and protect the integrity of the well and all related equipment. Acidic fluids (HCl, HF, etc.) are often used in stimulation operations such as in matrix acidizing and fracture acidizing treatments, where acidic fluids are injected into the well penetrating the rock pores to stimulate the well to improve flow or to remove damage. In matrix acidizing treatments, acidic treatment fluids are either injected into the well to react with and to dissolve the area surrounding the well to remove damage around the wellbore, or introduced into the subterranean formation under pressure (but below the fracture pressure) so that the acidic treatment fluids flow into the pore spaces of the formation and react with acid-soluble materials contained in the formation, resulting in an increase in the size of the pore spaces and an increase in the permeability of the formation. In fracture-acidizing treatments, the acidic treatment fluids are introduced above the fracture point of the formation to etch flow channels in the fracture face of the formation and to enlarge the pore spaces in the formation. The increase in formation permeability from these types of acidic treatments may increase the recovery of hydrocarbons from the formation. In most cases, acid stimulation procedures are carried out in calcareous formations such as dolomites, limestones, dolomitic sandstones, and the like.

A common problem associated with using acidic treatment fluids in subterranean formations is the corrosion of metal surfaces in piping, tubing, heat exchangers, reactors, downhole tools, and the other equipment which are exposed to such acid treatments. Further, other corrosive components such as brines, carbon dioxide, hydrogen sulfide, and microorganisms, may be entrained within the acidic stimulation fluids during stimulation, exacerbating the corrosion problem. Moreover, elevated temperatures are commonly encountered in deeper formations which increases the rate of corrosion. Corrosion issues are problematic for any drilling operation, but are even more troublesome in deep-sea operations where replacement of corroded equipment is difficult and costly.

Therefore, it is common practice to employ corrosion inhibitors during acid stimulation treatments of crude oil and natural gas wells. However, many corrosion inhibitors suffer from poor performance at low concentrations and particularly poor performance under high temperatures and under strongly acidic solutions, for example acidic solutions containing greater than or equal to 15 wt. % acid, necessitating the need for large quantities of corrosion inhibitors to be used. The use of large quantities of corrosion inhibitors is extremely undesirable when synthetic corrosion inhibitors are deployed in terms of both cost and from environmental concerns.

The present disclosure thus provides a method for inhibiting corrosion during acid stimulation in an oil and gas field. The methods involve treating or otherwise introducing an acidic treatment fluid containing an acid and a corrosion inhibitor into an oil and gas well.

Acidic Treatment Fluid

The acidic treatment fluid of the present disclosure generally contains an acid and a corrosion inhibitor of formula I (below). The acidic treatment fluid may optionally include one or more of a secondary corrosion inhibitor, an intensifier, a surfactant, an organic solvent, and an additive.

Acid

The acidic treatment fluid may contain a variety of acids, preferably water-soluble acids. Suitable acids include, but are not limited to, hydrochloric acid, formic acid, acetic acid, chloroacetic acid, hydrofluoric acid, sulfuric acid, sulfamic acid, as well as mixtures thereof, for example mud acid (mixtures of HCl and HF). In preferred embodiments, the acid is hydrochloric acid (HCl). Typically, the acidic treatment fluid contains 5 to 28 wt. % of the acid, preferably 7 to 24 wt. % of the acid, preferably 9 to 22 wt. % of the acid, preferably 10 to 20 wt. % of the acid, preferably 12 to 18 wt. % of the acid, preferably 14 to 16 wt. % of the acid(s) (e.g., HCl), based on a total weight of the acidic treatment fluid, although more concentrated (e.g., about 37 wt. %) or dilute versions may also be used in some circumstances. In some embodiments, the acidic treatment fluid has a pH of less than 3, preferably less than 2, preferably less than 1, preferably less than 0, for example from −2 to 0, or from −1 to 0.

In some embodiments, when the acidic treatment fluids are employed in the acid stimulation methods of the present disclosure, formation chemicals and fluids may become entrained therein. Therefore, in addition to the acid(s) listed above, the acidic treatment fluids may also contain other corrosive agents, including, but not limited to, carbon dioxide, corrosive sulfur species (e.g., hydrogen sulfide, mercaptans, etc.), brine, as well as mixtures thereof.

In some embodiments, the acidic treatment fluid is an aqueous solution, i.e., is substantially free of an oil phase (e.g., contains less than 1 wt. %, preferably less than 0.5 wt. %, more preferably less than 0.1 wt. %, even more preferably less than 0.05 wt. %, yet even more preferably 0 wt. % of an oil phase, based on a total weight of the acidic treatment fluid). Preferably, the acidic treatment fluid is injected into the oil and gas well as an aqueous solution for acid stimulation operations, and in doing so, only minor amounts of produced oil and gas from the geological formation is entrained therein.

In some embodiments, the acidic treatment fluid is a multi-phase mixture containing an aqueous phase and an oil phase (and in some cases a gas phase), one example being an emulsion. Such multi-phase mixtures may also be effective for acid stimulation operations and simultaneously inhibiting corrosion of metal. In some embodiments, the acidic treatment fluid is an emulsion, preferably a stable emulsion. In preferred embodiments, the acidic treatment fluid is an oil-in-water emulsion. In some embodiments, the acidic treatment fluid contains at least 5 wt. %, preferably at least 10 wt. %, preferably at least 15 wt. %, preferably at least 20 wt. %, preferably at least 25 wt. %, and up to 45 wt. %, preferably up to 40 wt. %, preferably up to 35 wt. %, preferably up to 30 wt. % of an oil phase, based on a total weight of the acidic treatment fluid.

The oil phase may include a natural oil, a synthetic oil, or both. Examples of oils from natural sources include, but are not limited to, kerosene, diesel oils, crude oils, gas oils, fuel oils, paraffin oils, mineral oils, low toxicity mineral oils, other petroleum distillates, and any combination thereof. Examples of synthetic oils include, but are not limited to, polyolefins, polydiorganosiloxanes, siloxanes, organosiloxanes, as well as mixtures thereof.

Corrosion Inhibitor

The acidic treatment fluids of the present disclosure also generally contain a corrosion inhibitor of formula I

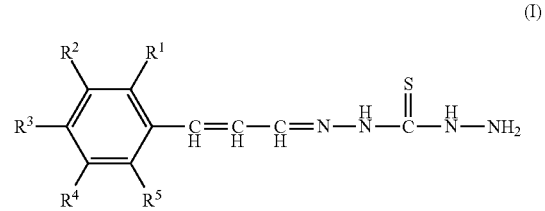

wherein $R^1$ to $R^5$ are independently hydrogen, an optionally substituted alkyl, an optionally substituted aryl, an optionally substituted alkoxy, an optionally substituted alkanoyloxy, a carboxy, an optionally substituted alkoxycarbonyl, a hydroxy, a halo, an amino group of the formula —$N(R_a)_2$, an alkyl ammonium salt of the formula —$(N(R_a)_3)^+$, a nitro, a cyano, a thiocyano, or wherein two of these adjacent substituents represented by $R^1$, $R^2$, $R^3$, $R^4$, or $R^5$, together form a methylene dioxy group, and wherein each $R_a$ is independently an optionally substituted alkyl or an optionally substituted aryl group. In preferred embodiments, $R^1$ to $R^5$ are independently hydrogen, an alkyl, an aryl, or an alkoxy.

The corrosion inhibitor of formula I may be tuned depending on the type of acidic treatment fluid utilized. For example, when the acidic treatment fluid is an aqueous solution, it may be advantageous to employ an unsubstituted corrosion inhibitor (e.g., $R^1$ to $R^5$ are each hydrogen) or a corrosion inhibitor containing polar functional groups (e.g., at least one of $R^1$ to $R^5$ is an alkoxy, amino, etc.). In some embodiments, $R^1$ to $R^5$ are each hydrogen (the corrosion inhibitor of formula I is N'-(3-phenylallylidene)-hydrazinecarbothiohydrazide (PHCT)). In some embodiments, at least one of $R^1$ to $R^5$, preferably at least two of $R^1$ to $R^5$ is an alkoxy, preferably an alkoxy having 1 to 5, preferably 2 to 4, or 3 carbon atoms. In some embodiments, $R^3$ is an alkoxy, preferably an alkoxy having 1 to 5, preferably 2 to 4, or 3 carbon atoms. In some embodiments, $R^1$, $R^2$, and $R^4$ are alkoxy groups, preferably alkoxy groups having 1 to 5, preferably 2 to 4, or 3 carbon atoms. In some embodiments, $R^2$ and $R^3$ together form a methylene dioxy group. In some embodiments, the corrosion inhibitor does not contain a carboxylic acid functional group.

Alternatively, when the acidic treatment fluid is a multiphase mixture containing an aqueous phase and an oil phase, for example, an oil-in-water emulsion, it may be advantageous to employ corrosion inhibitors of formula I that contain one or more alkyl groups, preferably one or more fatty alkyl groups. In some embodiments, at least one of $R^1$ to $R^5$, preferably at least two of $R^1$ to $R^5$ is an alkyl, preferably an alkyl having 6 to 18 carbon atoms, preferably 7 to 16 carbon atoms, preferably 8 to 14 carbon atoms, preferably 9 to 12 carbon atoms, preferably 10 to 11 carbon atoms.

The double bonds present in the corrosion inhibitors of formula I, that is, the carbon-carbon double bond that is in conjugation with the aryl group and the—(ene)hydrazinecarbothiohydrazide moiety and the carbon-nitrogen double bond, cause the geometry of such compounds to be planar and, therefore, cis and/or trans isomers may be present. In preferred embodiments, the double bonds in the corrosion inhibitor of formula I have a trans-configuration or when a mixture of isomers is present, a majority of the double bonds exist in the trans-isomer configuration. In this context, "majority" means that if a mixture of isomers are present, the trans-configuration is present in a proportion greater than 50 wt. %, preferably greater than 60 wt. %, preferably greater than 70 wt. %, preferably greater than 80 wt. %, preferably greater than 90 wt. %, preferably greater than 95 wt. % of said mixture.

The corrosion inhibitor of formula I may be prepared by a condensation reaction between thiocarbohydrazide ($H_2N$—NH—C(S)—NH—$NH_2$) and an appropriate cinnamaldehyde compound of formula II.

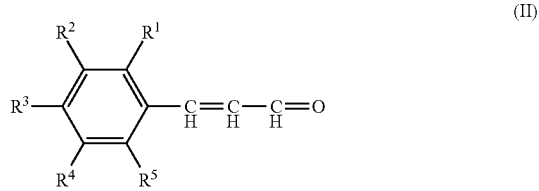

wherein $R^1$ to $R^5$ are as described previously. The thiocarbohydrazide and the cinnamaldehyde compound of formula II are preferably reacted in a molar ratio of 1.5:1 to 1:1.5, preferably 1.4:1 to 1:1.4, preferably 1.3:1 to 1:1.3, preferably 1.2:1 to 1:1.2, preferably 1.1:1 to 1:1.1, preferably 1:1. The condensation reaction may be performed in water, a polar aprotic solvent, an aromatic solvent, an alcoholic solvent, or mixtures thereof, preferably in a mixture of water and alcoholic solvent, preferably water and ethanol. The condensation may be performed at any appropriate temperature depending on the solvent employed and the reactivity of the cinnamaldehyde compound, for example, 25 to 100° C., preferably 35 to 90° C., preferably 45 to 80° C., preferably 50 to 70° C.

Exemplary cinnamaldehyde compounds (formula II) that can be used to make the corrosion inhibitor of the present disclosure include, but are not limited to, cinnamaldehyde (i.e., $R^1$ to $R^5$ are each hydrogen), p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, p-diethylaminocinnamaldehyde, p-nitrocinnamaldehyde, o-nitrocinnamaldehyde, 3,4-methylenedioxycinnamaldehyde, p-trimethylammoniumcinnamaldehyde, p-thiocyanocinnamaldehyde, p-chlorocinnamaldehyde, as well as mixtures thereof.

In some embodiments, the acidic treatment fluid is substantially free of dimeric reaction products obtained by a double condensation reaction between thiocarbohydrazide ($H_2N$—NH—C(S)—NH—$NH_2$) and two cinnamaldehyde compounds of formula II (e.g., 1,1'-dicinnamylidine-3-thiocarbohydrazine).

The corrosion inhibitor of formula (I) may be used in any amount sufficient to provide a desired anticorrosive effect. It has been surprisingly found that highly effective anticorrosion properties are obtained when the corrosion inhibitor of formula (I) is employed in amounts of 0.001 to 1 wt. %, preferably 0.002 to 0.8 wt. %, preferably 0.003 to 0.5 wt. %, preferably 0.004 to 0.3 wt. %, preferably 0.005 to 0.2 wt. %, preferably 0.008 to 0.1 wt. %, preferably 0.01 to 0.08 wt. %, preferably 0.015 to 0.05 wt. %, preferably 0.02 to 0.045 wt. %, preferably, based on a total weight of the acidic treatment fluid. Of course, dosages above or below these values may be used in some circumstances, when appropriate.

Without being bound by theory, the corrosion inhibitor of formula I may be a mixed-type inhibitor, i.e., may form a film on the surface of the metal that reduces both the cathodic and anodic reactions that cause corrosion, and may thus remain effective at such extremely low dosages.

In some embodiments, the corrosion inhibitor of formula I is the only corrosion inhibitor present in the acidic treatment fluid. In some embodiments, the acidic treatment fluid consists essentially of, or consists of, the acid and the corrosion inhibitor of formula I in water (the acidic treatment fluid is an aqueous solution of the acid and the corrosion inhibitor of formula I). In some embodiments, the acidic treatment fluid consists essentially of, or consists of, the acid and the corrosion inhibitor of formula I in an oil-in-water emulsion (the acidic treatment fluid is an emulsion of the acid the corrosion inhibitor of formula I in oil and water).

Secondary Corrosion Inhibitor

The acidic treatment fluid may also optionally include a secondary corrosion inhibitors (in addition to the corrosion inhibitor of formula I). Suitable secondary corrosion inhibitors include, but are not limited to, a cinnamaldehyde compound, an alkoxylated fatty amine, and an imidazoline compound, as well as mixtures thereof. When used, the secondary corrosion inhibitor may be present in amounts of 0.01 to 15 wt. %, preferably 0.05 to 10 wt. %, preferably 0.1 to 8 wt. %, preferably 0.5 to 5 wt. %, preferably 1 to 2 wt. %, based on a total weight of the acidic treatment fluid.

The cinnamaldehyde compound generally contains an optionally substituted aryl group separated from an aldehyde moiety (or protecting group thereof) by one unsaturated carbon-carbon double bond or a two or more unsaturated carbon-carbon double bonds in conjugation (i.e., polyene moiety), the simplest of which is cinnamaldehyde (i.e., 3-phenyl-2-propen-1-al, $C_6H_5CH\!=\!\!CHCHO$), which may be obtained naturally from cinnamon oil. For example, the cinnamaldehyde compound may be the cinnamaldehyde compound of formula II discussed above. The aryl group may be unsubstituted (contain only hydrogen as is the case in cinnamaldehyde) or may be substituted with up to 5 substituents individually selected from the group consisting of an optionally substituted alkyl, an optionally substituted aryl, an optionally substituted alkoxy, an optionally substituted alkanoyloxy, a carboxy, an optionally substituted alkoxycarbonyl, a hydroxy, a halo, an amino group of the formula $-NH_2$, $-NHR_a$, or $-N(R_a)_2$, an alkyl ammonium salt of the formula $-(N(R_a)_3)^+$, a nitro, a cyano, a sulfate anion, an alkylsulfate, a thiocyano, an optionally substituted alkylthio, an optionally substituted alkylsulfonyl, an optionally substituted arylsulfonyl, or an optionally substituted sulfonamido (e.g., $-SO_2NH_2$), or wherein two adjacent substituents together form a methylene dioxy group.

Examples of cinnamaldehyde compounds that can be used herein include, but are not limited to, cinnamaldehyde, 3,3'-(1,4-phenylene)diacrylaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, p-diethylaminocinnamaldehyde, p-nitrocinnamaldehyde, o-nitrocinnamaldehyde, 3,4-methylenedioxycinnamaldehyde, sodium p-sulfocinnamaldehyde, p-trimethylammoniumcinnamaldehyde, p-trimethylammoniumcinnamaldehyde o-methylsulfate, p-thiocyanocinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, and p-methyl-α-pentylcinnamaldehyde, as well as mixtures thereof. Without being bound by theory, the cinnamaldehyde compound herein may inhibit corrosion caused by acidic mediums by undergoing an acid catalyzed polymerization reaction thereby forming a thin film on the metal surface being protected.

The acidic treatment fluid may optionally include an alkoxylated fatty amine. Fatty amines are compounds having a long-chain alkyl group made up of hydrogen and anywhere from 6 to 26 carbon atoms, preferably 8 to 22 carbon atoms, preferably 12 to 20 carbon atoms, more preferably 16 to 18 carbon atoms, bonded to an amine functional group. The fatty portion of the fatty amine may be saturated or may contain sites of unsaturation, for example, the fatty portion may be mono-, di-, tri-, oligo-, or poly-unsaturated. The fatty portion of the fatty amine preferably contains sites of unsaturation from the point of view of solubility. The site(s) of unsaturation may be cis-double bonds, trans-double bonds, or a combination. The fatty amines may be derivable from fatty acids, for example by subjecting a fatty acid, either a synthetic fatty acid or a naturally occurring fatty acid, to the Nitrile process followed by reduction (e.g., hydrogenation), which is known by those of ordinary skill in the art. Exemplary fatty acid starting materials that may be used to make the fatty amine include, for example, caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as fatty acid mixtures (natural or synthetic mixtures) such as tall oil fatty acid and its derivatives (TOFA), coconut oil and its derivatives, tallow fatty acid and its derivatives (tallow). naphthenic acids and its derivatives, soya fatty acid and its derivatives (soya), and the like. Therefore, the fatty amines may also exist as a distribution or mixture of fatty amines when derived from mixtures of (naturally occurring) fatty acids. Exemplary fatty amines derivable or manufactured from fatty acids, include, but are not limited to, coco amine, stearyl amine, palmitoleylamine, oleylamine, tallow amine (e.g., Farmin TD, commercially available from Kao), tall oil fatty acid amine, laurylamine, linoleylamine, myristylamine, cetylamine, stearylamine, and soya amine, any of which may be optionally hydrogenated, partially hydrogenated, or non-hydrogenated.

The fatty amine may be a fatty monoamine, such as primary fatty amines ($R-NH_2$), and secondary di-fatty amines ($R_2-NH$), or fatty lower alkyl (e.g., methyl) amines ($R-NH-CH_3$); or a fatty (poly)alkylene polyamine, such as fatty ethylene diamines ($R-NH-(CH_2)_2-NH_2$), fatty ethylene triamines (linear or branched, $R-NH-(CH_2)_2-NH-(CH_2)_2-NH_2$), fatty ethylene tetramines (linear or branched, $R-NH-(CH_2)_2-NH-(CH_2)_2-NH-(CH_2)_2-NH_2$), fatty propylene diamines ($R-NH-(CH_2)_3-NH_2$), fatty propylene triamines (linear or branched, $R-NH-(CH_2)_3-NH-(CH_2)_3-NH_2$), and fatty propylene tetramines (linear or branched, $R-NH-(CH_2)_3-NH-(CH_2)_3-NH-(CH_2)_3-NH_2$). In preferred embodiments, R (above) is a mixture of long-chain alkyl groups derived from naturally occurring fatty acid mixtures such as tall oil fatty acid and its derivatives (TOFA), coconut oil and its derivatives, tallow fatty acid and its derivatives (tallow), naphthenic acids and its derivatives, soya fatty acid and its derivatives (soya), and the like.

Any of the aforementioned fatty amines may be alkoxylated to provide the alkoxylated fatty amines useful in the present disclosure. Primary fatty amines may be alkoxylated with one or two polyoxyalkylene ether groups (i.e., mono- or bis-alkoxylated), and secondary fatty amines may be alkoxylated with one polyoxyalkylene ether group (i.e., mono-alkoxylated). Suitable examples of alkoxylated fatty amines include, but are not limited to, a coconut amine alkoxylate, a stearyl amine alkoxylate, a palmitoleylamine alkoxylate, a oleylamine alkoxylate, a tallow amine alkoxylate, a tall oil amine alkoxylate, a laurylamine alkoxylate, a myristylamine alkoxylate, a cetylamine alkoxylate, a stearylamine alkoxylate, a linoleyl amine alkoxylate, a soya amine alkoxylate, as well as alkoxylated ethylene diamine variants thereof, alkoxylated trimethylene diamine variants thereof, alkoxylated diethylene triamine variants thereof, and alkoxylated dipropylene triamine variants thereof, preferably the alkoxylated fatty amine is an ethoxylated fatty amine.

Imidazoline compounds are those compounds which can be generally formed from a reaction between (i) a fatty acid or an ester derivative thereof, for example a $C_1$ to $C_{12}$ alkyl ester (e.g., methyl, ethyl, etc.) of a fatty acid or a glycerol ester of a fatty acid, and (ii) a polyamine which contains at least one ethylene diamine group (i.e., a polyamine containing at least one vicinal diamine). The imidazoline compound may be a non-ionic cyclization reaction product from reaction between (i) and (ii), or the imidazoline compound may be a modified imidazoline (cationic or amphoteric). Examples of cationic imidazolines include those non-ionic cyclization products which are further protonated by reaction with an acid or alkylated forming quaternary ammonium functional groups. Examples of amphoteric imidazolines include betaine-type imidazolines.

In some embodiments, the imidazoline compound is prepared from reaction between (i) tall oil fatty acid, coconut oil fatty acid, tallow fatty acid, soya fatty acid, and/or oleic acid. and (ii) any polyamine containing two, three, four, or more nitrogen groups, which may be primary, secondary, or tertiary amines, so long as at least one ethylene diamine group is present that is capable of reacting with a carboxylic acid group to form an imidazoline structure. Suitable polyamines include, but are not limited to, ethylene diamine, β-hydroxyethyl ethylene diamine, 1,2-diaminopropane, 1,2-diaminocyclohexane, 2,3-diaminobutane, 2,3-diaminobutan-1-ol, propane-1,2,3-triamine, tris(2-aminoethyl)amine, tetraethylenepentamine (TEPA), diethylenetriamine (DETA), triethylentetramine (TETA), aminoethylethanolamine (AEEA), pentaethylene hexamine (PEHA), and hexaethylene heptamine (HEHA).

A wide range of molar ratios of (i) and (ii) may be employed to form the imidazoline compounds herein, however, in preferred embodiments the molar ratio of (i) to (ii) is 1:5 to 5:1, preferably 1:1 to 5:1, more preferably 2:1 to 4:1, or any integers or non-integers in between. Imidazoline compounds that may be used in the acidic treatment fluids herein may include, but are not limited to, 1:1 (molar ratio) TOFA/DETA imidazoline, 2:1 TOFA/DETA imidazoline, 1:1 TOFA/TETA imidazoline, 2:1 TOFA/TETA imidazoline, 2:1 TOFA/TETA bis-imidazoline, 1:1 TOFA/TEPA imidazoline, 2:1 TOFA/TEPA imidazoline, 2:1 TOFA/TEPA bis-imidazoline, 3:1 TOFA/TEPA bis-imidazoline, 1:1 TOFA/AEEA imidazoline, 2:1 TOFA/AEEA imidazoline, 1:1 TOFA/polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, Soya/TEPA imidazoline, 2:1 Soya/TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/DETA irnidazoline, 1:1 Tallow/TETA imidazoline, 2:1 Tallow/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AEEA imidazoline, 2:1 Tallow/AEEA imidazoline, 1:1 Tallow/polyamine imidazoline, 2:1 Tallow/polyamine imidazoline, 2:1 Tallow/polyamine bis-imidazoline, 3:1 Tallow/TEPA polyamine bis-imidazoline, as well as mixtures thereof. Most preferably, when present, the imidazoline is 1:1 TOFA-DETA imidazoline or 1:1 TOFA-AEEA.

Other secondary corrosion inhibitors which may be optionally included in the acidic treatment fluids include, but are not limited to, chromates, zinc salts, (poly)phosphates, organic phosphorus compounds (phosphonates), acetylenic alcohols (e.g., propargylic (propargyl) alcohol, pent-4-yn-1-ol, hexynol, ethyl octynol, octynol, 3-phenyl-2-propyn-1-ol), α,β-unsaturated aldehydes (other than cinnamaldehydes) (e.g., crotonaldehyde), aromatic aldehydes (e.g., furfural, p-anisaldehyde), phenones including alkenyl phenone (e.g., β-hydroxypropiophenone, phenyl vinyl ketone), nitrogen-containing heterocycles (e.g., piperazine, hexamethylene tetramine), quaternized heteroarenes (e.g., 1-(benzyl)quinolinium chloride), condensation products of carbonyls and amines (e.g., Schiff base), and polymers obtained from natural sources (e.g., chitin, collagen, pectin, plant gums such as gum Arabic and guar gum, etc.).

In preferred embodiments, the acidic treatment fluid is substantially free of secondary corrosion inhibitors. In preferred embodiments, the acidic treatment fluid is substantially free of a cinnamaldehyde compound, an alkoxylated fatty amine, and an imidazoline compound.

Intensifier

In some situations, for example, under particularly harsh conditions, the acidic treatment fluid may optionally further include one or more intensifiers to further diminish the rate of corrosion. Suitable intensifiers may include, but are not limited to, carboxylic acid compounds having 1 to 12 carbon atoms or an ester (including protected carboxylic acid derivatives) or salt thereof, such as formic acid, acetic acid, oxalic acid, glycolic acid, propionic acids/esters/salts (e.g., propionic acid, 2-hydroxypropionic acid, 3-hydroxypropionic acid, 2-methoxypropionic acid, 3-methoxypropionic acid, 2-hydroxypropionic acid methyl ester, 3-hydroxypropionic acid methyl ester, 2-methoxypropionic acid methyl ester, 3-methoxypropionic acid methyl ester, sodium 2-hydroxypropionate, sodium 3-hydroxypropionate, sodium 2-methoxypropionate, and sodium 3-methoxypropionate), lactic acid, butanoic acid, isobutyric acid, pentanoic acid, arabinaric acid, glucaric acid, tartaric acid, 1,1-cyclobutanedicarboxylic acid, 2-(2-propynyl)malonic acid, 2,2-bis(hydroxymethyl)butanoic acid, 2,2-bis(hydroxymethyl)propionic acid, 2,2-diethylmalonic acid, 2,2-dihydroxymalonic acid hydrate, 2,2-dimethyl-1,3-dioxane-4,6-dione, 2,2-dimethylmalonic acid, 2-allylmalonic acid, 2-amino-2,4,5-trideoxypentonic acid, 2-butylmalonic acid, 2-ethylmalonic acid, 2-hydroxy-2-methyl succinic acid, 2-isopropylmalonic acid, 2-methylmalonic acid, 2-methylserine, 3-(acryloyloxy)propanoic acid, 3-ethoxy-2-methyl-3-oxopropanoic acid, 3-ethoxypropanoic acid, 3-hydroxy-2-(hydroxymethyl)-2-methylpropanoic acid, 3-hydroxy-2,2-dimethylpropanoic acid, 3-hydroxy-2-oxopropanoic acid, 3-hydroxy-3-methylbutanoic acid, 3-hydroxybutanoic acid, 3-hydroxyproline, 3-methoxy-2-methyl-3-oxopropanoic acid, 3-methoxy-3-oxopropanoic acid, 3-methoxyalanine, 3-methoxybutanoic acid, 3-methoxypropanoic acid, 3-methoxyvaline, 4-amino-3-hydroxybutanoic acid, 4-hydroxy-4-methyltetrahydro-2H-pyran-2-one, 4-methyl-5-oxotetrahydro-3-furancarboxylic acid, diethyl malonate, dimethyl 2-ethylidenemalonate, dimethyl 2-methylmalonate, dimethyl malonate, disodium malonate, ethyl 3-ethoxypropanoate, ethyl 3-hydroxybutanoate, hydroxydihydro-2(3H)-furanone, lithium 3-hydroxy-2-oxopropanoate, malic acid, malonic acid, methyl 2-(1-hydroxyethyl)acrylate, methyl 2-amino-3-hydroxybutanoate, methyl 2-amino-3-hydroxypropanoate hydrochloride, methyl 2-oxo-2H-pyran-3-carboxylate, methyl 3,3-dimethoxypropanoate, methyl 3-hydroxy-2-(hydroxymethyl)-2-methylpropanoate, methyl 3-hydroxy-2,2-dimethylpropanoate, methyl 3-hydroxyhexanoate, methyl 3-methoxypropanoate, N-acetylserine, potassium 3-methoxy-3-oxopropanoate, serine, sodium 3-hydroxybutanoate, sodium malonate dibasic monohydrate, tartronic acid, and threonine, for example, those carboxylic acids/esters/salts/protected derivatives described in WO 2007007025 A1—incorporated herein by reference in its entirety;

formates such as $C_1$-$C_4$ alkyl formates (e.g., methyl formate and ethyl formate), aryl formates, and arylalkyl formates (e.g., benzyl formate);

formamides such as formamide, dimethyl formamide, 1,1'-azobisformamide;

metal halides such as sodium chloride, sodium bromide, potassium bromide, sodium iodide, potassium iodide, copper(I) chloride, copper(I) iodide, copper(II) chloride, copper(II) iodide, antimony chloride;

as well as combinations thereof.

When employed, the intensifier is preferably at least one selected from the group consisting of CuI, KI, and formic acid, more preferably KI.

The intensifier may be pre-mixed with the acid, the corrosion inhibitor of formula I, and any other optional component to form the acidic treatment fluid above hole, and the pre-made acidic treatment fluid may be introduced into the oil and gas well. Alternatively, the intensifier may be added to the oil and gas well as a separate component and the acidic treatment fluid containing the intensifier may be formed downhole as or once the components mix.

When employed, the intensifier may be present in a concentration of 0.001 to 3 wt. %, preferably 0.005 to 1 wt. %, preferably 0.01 to 0.5 wt. %, preferably 0.05 to 0.15 wt. %, preferably 0.08 to 0.1 wt. %, based on a total weight of the acidic treatment fluid.

In some embodiments, the acidic treatment fluid is substantially free of an intensifier.

In some embodiments, the acidic treatment fluid is substantially free of carboxylic acid compounds having 1 to 12 carbon atoms or an ester or salt or protected carboxylic acid derivative thereof, and metal halides (e.g., CuI, KI).

Surfactant

The acidic treatment fluid may optionally include one or more surfactants. The surfactant(s), when present, may be included in an amount of 0.001 to 5 wt. %, preferably 0.005 to 3 wt. %, preferably 0.01 to 1 wt. %, preferably 0.1 to 0.5 wt. %, preferably 0.2 to 0.4 wt. %, based on a total weight of the acidic treatment fluid. Cationic, anionic, non-ionic, and/or amphoteric surfactants may be employed herein, preferably the surfactant is an anionic surfactant.

Cationic surfactants may include, but are not limited to a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;

a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropane-1,3-diamine, $N^1,N^1$-diethylethane-1,2-diamine, $N^1,N^1$-diethylpropane-1,3)-diamine, spermidine, 1,1,1-tris(aminomethyl)ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride;

as well as mixtures thereof.

Anionic surfactants may include, but are not limited to:

sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate;

sulfonates such as dodecyl benzene sulfonate, lower alkyl-benzene sulfonates, alpha olefin sulfonates, lignosulfonates, sulfo-carboxylic compounds;

phosphates of fatty alcohols or polyoxyalkylene ethers of fatty alcohols such as cetyl phosphate salts, dicetyl phosphate salts, ceteth-10-phosphate salts;

carboxylate salts of fatty acids, acylamino acids, lactylates, and/or fatty alcohols/polyoxyalkylene ethers of fatty alcohols such as sodium stearate, sodium behenoyl lactylate, sodium isostearoyl lactylate, sodium caproyl lactylate, sodium laureth-5 carboxylate, sodium laureth-6 carboxylate, sodium laureth-11 carboxylate;

and mixtures thereof.

Non-ionic surfactants may include, but are not limited to:

alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols;

and mixtures thereof.

Amphoteric surfactants may include, but are not limited to:

$C_6$-$C_{22}$ alkyl dialkyl betaines, such as fatty dimethyl betaines (R—N(CH$_3$)$_2$($^+$)—CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—CH$_2$CH$_2$CH$_2$—N(CH$_3$)$_2$($^+$)—CH$_2$COO$^-$ or R—CO—NH—CH$_2$CH$_2$—N(CH$_3$)$_2$($^+$)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3^-$ or R—CO—NH—CH$_2$CH$_2$CH$_2$—N(CH$_3$)$_2$($^+$)—CH$_2$CH$_2$CH$_2$SO$_3^-$ or R—CO—NH—CH$_2$CH$_2$—N(CH$_3$)$_2$($^+$)—CH$_2$CH$_2$CH$_2$SO$_3^-$) or a hydroxysulfonic group (R—N(CH$_3$)$_2$($^+$)—CH$_2$CH(OH)—CH$_2$SO$_3^-$ or R—CO—NH—CH$_2$CH$_2$CH$_2$—N(CH$_3$)$_2$($^+$)CH$_2$CH(OH)—CH$_2$SO$_3^-$ or R—CO—NH—CH$_2$CH$_2$—N(CH$_3$)$_2$($^+$)—CH$_2$CH(OH)—CH$_2$SO$_3^-$), such as $C_{10}$-$C_{18}$ dimethyl hydroxysultaine and $C_{10}$-$C_{18}$ amido propyl dimethylamino hydroxysultaine;

and mixtures thereof.

When employed, the surfactant is preferably sodium dodecyl sulfate. In some embodiments, the acidic treatment fluid does not contain a surfactant, in particular sodium dodecyl sulfate.

Organic Solvent

In preferred embodiments, the base solvent of the acidic treatment fluid is water. However, the acidic treatment fluid may also optionally include one or more organic solvents, which may aid solvation of the various ingredients as well as facilitate transfer of the active ingredients to the appropriate location within the wellbore or geological formation. In preferred embodiments, organic solvent(s) may be added in amounts of 1 to 30 vol. %, preferably 3 to 25 vol. %, preferably 5 to 20 vol. %, preferably 8 to 16 vol. %, preferably 10 to 14 vol. %, based on a total volume of the acidic treatment fluid. The organic solvent may be at least one selected from the group consisting of a polar aprotic solvent, an aromatic solvent, a terpineol, a mono alcohol with 1 to 12 carbon atoms, and a polyol with 2 to 18 carbon atoms.

Acceptable organic solvents include, but are not limited to, formamide, dimethyl formamide, dimethyl acetamide, acetone, methyl ethyl ketone, methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof. In preferred embodiments, the organic solvent is at least one selected from the group consisting of acetone, methyl ethyl ketone, methanol, ethanol, propanol, isopropanol, n-butanol, isobutanol, ethylene glycol, and diethylene glycol, more preferably acetone and ethanol.

Additives

The acidic treatment fluids may optionally further include one or more additives to modify the properties or functions of the acidic treatment fluid, as needed. Typically, when present, the additive(s) may be incorporated in an amount of less than 10 wt. %, preferably less than 8 wt. %, preferably less than 6 wt. %, preferably less than 4 wt. %, preferably less than 2 wt. %, preferably less than 1 wt. %, preferably less than 0.5 wt. %, preferably less than 0.1 wt. %, based on a total weight of the acidic treatment fluid.

Additive(s) suitable for use in oil and gas well operations are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof, see U.S. Pat. No. 7,621,334—incorporated herein by reference in its entirety), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite;

chelating agents, such as chelating agents useful as sequesteration agents of metal ions, for example iron control agents, such as ethylene diamine tetraacetic acid (EDTA), di ethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA);

stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates;

dispersing agents e.g., polymeric or co-polymeric compounds of polyacrylic acid, polyacrylic acid/maleic acid copolymers, styrene/maleic anhydride copolymers, polymethacrylic acid and polyaspartic acid;

scale inhibitors e.g., sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;

emulsifiers such as a tallow amine, a ditallow amine, or combinations thereof, for example a 50% cone ation of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol; as well as mixtures thereof.

In some embodiments, the acidic treatment fluid is substantially free of a surfactant. In some embodiments, the acidic treatment fluid is substantially free of an organic solvent. In some embodiments, the acidic treatment fluid is substantially free of an additive (e.g., viscosity modifying agents, chelating agents, stabilizing agents, dispersing agents, scale inhibitors, and/or defoaming agents). In some embodiments, the acidic treatment fluid is substantially free of polymers, including both water-soluble and oil-soluble polymers. In preferred embodiments, the acidic treatment fluid is substantially free of a polysaccharide (e.g., xanthan gum, scleroglucan, and diutan), a synthetic polymer (e.g., polyacrylamides and co-polymers thereof), and a quaternary ammonium surfactant.

Oil and Gas Well

The corrosion inhibitor of formula I of the present disclosure may be deployed during any upstream (exploration, field development, and production operations), midstream (transportation e.g., by pipeline, processing, storage, and distribution), or downstream (manufacturing, refining, wholesale) oil and gas process where metal corrosion is a concern. However, the corrosion inhibitor of formula I has been found to be particularly effective at combating corrosion caused by concentrated acidic fluids, and thus are advantageously employed during upstream processes, more preferably during acid stimulation treatments where corrosion caused by highly acidic mediums is a primary concern, even more preferably during matrix acidizing treatments.

In some embodiments, the acidic treatment fluid may be an aqueous solution of the acid and the corrosion inhibitor of formula I, and any optional components.

However, one common problem associated with conventional acidizing treatment systems is that deeper penetration into the formation is not usually achievable because the acid may be spent before it can deeply penetrate into the subterranean formation. For instance, conventional acidizing fluids, such as those that contain sulfuric acid, hydrochloric acid, or a mixture of such acids with hydrofluoric acid, have high acid strength and quickly react with the formation itself, fines and damage nearest the well bore, and often times do not penetrate the formation to a desirable degree before becoming spent. To achieve improved results, it may often be desirable to maintain the acidic solution in a reactive condition for as long a period as possible to maximize the degree of penetration so that the permeability enhancement produced by the acidic solution may be increased. The emulsified state of the acid makes it diffuse at much slower rate, thereby retarding the chemical reaction rate with the formation. Therefore, in some embodiments, the acidic treatment fluid is a multiphase mixture comprising an oil phase and an aqueous phase, for example, an emulsion.

In some embodiments, the acidic treatment fluids may be injected down the annulus of a well and optionally flushed with solvent. In some embodiments, the acidic treatment fluid is pre-formed above well by combining the acid (aq.) and the corrosion inhibitor of formula I, and any optional components, followed by injecting the pre-formed acidic treatment fluid downhole for the acid stimulation operation. In some embodiments, the acid (aq.) and the corrosion inhibitor of formula I (and any optional components) are injected downhole as separate streams, combining downhole to form the acidic treatment fluid for acid stimulation. The corrosion inhibitor of formula I may be injected before, after, or simultaneously with the acid (aq.) for use in the stimulation process.

Likewise, when acidic treatment fluids in the form of multi-phase mixtures are utilized, the methods may involve preforming the acidic treatment fluids containing both the aqueous phase and the oil phase above well, then injecting the pre-formed acidic treatment fluid (e.g., emulsion) downhole for the acid stimulation operation. Alternatively, the methods may involve first injecting the oil phase (e.g., kerosene, diesel oil, crude oil, gas oil, fuel oil, paraffin oil, mineral oil, low toxicity mineral oil, other petroleum distillate, polyolefin, polydiorganosiloxane, siloxane, organosiloxane) downhole, followed by injecting the aqueous phase (acid (aq.), corrosion inhibitor, and any optional components) downhole, where the phases are combined downhole to form the multi-phase mixture for acid stimulation.

Injection may proceed through suitable injection lines to areas where acid stimulation treatment is desired or where corrosion can, or is likely to, occur through capillaries or umbilical lines (in many cases at the wellhead if suitable metallurgy is used downhole). Injection may be performed manually or it may be automatic, for example, by using chemical injection pumps. In some embodiments, the acidic treatment fluid may be stored in a chemical storage tank and a chemical injection pump associated therewith may be used to introduce the acidic treatment fluid into the desired location of the operation. In any of the above applications, the acidic treatment fluid or any of its components combinable downhole may be injected continuously and/or in batches. The chemical injection pump(s) can be automatically or manually controlled to inject any amount of the acidic treatment fluid needed for acidizing operations or any amount of the corrosion inhibitor of formula I suitable for inhibiting corrosion.

The acidic treatment fluids may be in contact with many different types of surfaces on tubing and field equipment that are susceptible to corrosion. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionation columns, cracking units, pump parts (e.g., parts of beam pumps), and in particular downhole surfaces that are most likely to come into contact with the acidic treatment fluids during stimulation operations, such as those casings, liners, pipes, bars, pump parts such as sucker rods, electrical submersible pumps, screens, valves, fittings, and the like.

Any metal surface that may come into contact with the acidic treatment fluid may be protected by the corrosion inhibitor of formula I of the present disclosure. Typical metals found in oil and gas field environments that may be protected include carbon steels (e.g., mild steels, high-tensile steels, higher-carbon steels), including American Petroleum Institute (API) carbon steels; high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof. Specific examples of typical oil field tubular steels include X60, J-55, N-80, L-80, P:105, P110, and high alloy chrome steels such as Cr-9, Cr-13, Cr-2205, Cr-2250, and the like.

In preferred embodiments, the methods herein inhibit corrosion of API N-80 carbon steel.

The corrosion inhibitor of formula I performs surprisingly well to inhibit corrosion in highly acidic mediums and at temperatures even up to 180° C., for example at temperatures of 25 to 180° C., preferably 35 to 160° C., preferably 45 to 140° C., preferably 55 to 120° C., preferably 65 to 110° C., preferably 75 to 100° C., preferably 85 to 90° C.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight of the metal during reference time), area (initial surface area of the metal), time (length of exposure time) and density of the metal. Corrosion rate may be measured according to the American Society for Testing and Materials (ASTM) standard weight loss (immersion) test (e.g., according to ASTM G31-72 and described in the Examples), and may be computed using millimeters per year (mm/y). In some embodiments, the method provides a corrosion rate of 16 to 100 mm/y, preferably 18 to 90 mm/y, preferably 20 to 80 mm/y, preferably 22 to 70 mm/y, preferably 24 to 65 mm/y, preferably 26 to 60 mm/y, preferably 28 to 50 mm/y, preferably 30 to 45 mm/y, preferably 32 to 40 mm/y, when exposed to 15 wt. % of the acid at 90° C.

Corrosion inhibition efficiencies (IE %) may be measured by comparing the corrosion rates obtained from acidic treatment fluids with and without corrosion inhibitors using weight loss (immersion) studies, electrochemical impedance spectroscopy (EIS), potentiodynamic polarization (PDP), or other similar methods. In some embodiments, the method described herein achieves a corrosion inhibition efficiency of 80 to 99.5%, preferably 83 to 99%, preferably 85 to 98%, preferably 90 to 97%, preferably 91 to 96%, preferably 92 to 95%.

Of course, the methods herein do not preclude introduction of other known chemical treatments into oil and gas field production and downstream transportation, distribution, and/or refining systems, and thus the acidic treatment fluids may be used in conjunction with other chemical treatments known to those of ordinary skill in the art, including, but not limited to, hydrate inhibitors, scale inhibitors, asphaltene inhibitors, paraffin inhibitors, $H_2S$ scavengers, $O_2$ scavengers, emulsion breakers, foamers and defoamers, and water clarifiers.

The examples below are intended to further illustrate protocols for preparing and testing the acidic treatment fluids and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Material and Methods
Chemical Composition and Preparation of N80 Steel

The N80 steel used for gravimetric and electrochemical experiments has the following composition (wt. %): C 0.31%, Si 0.19%, Mn 0.92%, P 0.01%, S 0.008%, Cr 0.2%, and Fe in balance. The N80 steel strips with dimension of 5.0 cm×2.5 cm×0.2 cm were used for gravimetric experiment and for electrochemical experiments dimension of 2.0 cm×1.0 cm were used. The exposed area of steel strip in acid solution for electrochemical experiments is 1 cm$^2$.

The surface finishing and cleaning of N80 steels were done according to the National Association of Corrosion Engineers (NACE) Recommended Practice. The steel strips were mirrored polished using different grades of silicon carbide paper (600 to 1200). The steel specimens were washed with double distilled water, acetone and dried at room temperature and finally, enclosed in sealed water-proof bags and stored in desiccators.

Preparation of Test Solutions and Inhibitor

15% HCl solution was prepared by diluting analytical grade hydrochloric acid with double-distilled water. In the inhibitor formulations, the concentration of inhibitor used is 0.05 wt. %. A series of inhibitor formulations have been prepared:

Example 2

0.05 wt. % PHCT+0.25 wt. % KI+0.10 wt. % SDS+10 vol. % acetone

Example 4

0.05 wt. % PHCT+0.25 wt. % KI+0.10 wt. % SDS+10 vol. % ethyl alcohol
0.05 wt. % PHCT+0.25 wt. % KI+0.10 wt. % SDS+5 vol. % ethyl alcohol+5 vol. % acetone
0.05 wt. % PHCT+0.25 wt. % KI+0.10 wt. % SDS+10 vol. % acetone

Example 5

0.05 wt. % PHCT+0.10 wt. % SDS+0.25 wt. % NaCl+10 vol. % acetone

Example 6

0.05 wt. % PHCT+0.10 wt. % SDS+0.10 wt. % KI+10 vol. % acetone
0.05 wt. % PHCT+0.10 wt. % SDS+0.25 wt. % KI+10 vol. % acetone
0.05 wt. % PHCT+0.10 wt. % SDS+0.50 wt. % KI+10 vol. % acetone

Example 7

0.05 wt. % PHCT+0.05 wt. % SDS+0.10 wt. % KI+10 vol. % acetone
0.05 wt. % PHCT+0.25 wt. % KI+0.10 wt. % SDS+10 vol. % acetone
0.05 wt. % PHCT+0.15 wt. % SDS+0.10 wt. % KI+10 vol. % acetone A series of inhibitors (alone) in varying concentrations were also prepared:

Example 3

0.001 wt. % PHCT
0.002 wt. % PHCT
0.003 wt. % PHCT
0.004 wt. % PHCT
0.005 wt. % PHCT
0.05 wt. % PHCT
0.1 wt. % PHCT
0.2 wt. % PHCT
0.3 wt. % PHCT
0.5 wt. % PHCT

The weight loss tests were performed for 6 h duration at 90° C.

Inhibitor Synthesis

Thiocarbohydrazide 10.6 gm (0.10 mole) was dissolved in 200 ml hot water and treated with 12.6 ml Cinnamaldehyde (0.10 mole) in ethanol (30 ml) dropwise with stirring for 20 minutes at 50° C., then the mixture was allowed to stand overnight to give a yellow colored solid compound namely: N'-(3-phenylallylidene) hydrazinecarbothiohydrazide (PHCT). Thus obtained compound was crystallized by equal ratio of acetone and ethanol. Yield 98.90%. The molecular structure of inhibitor is given in FIG. 1.

Corrosion Measurements Methods
Weight Loss Method

N80 steel strips were dipped into the tested solution containing inhibitor with different formulations. The volume of acid used was 100 mL. The initial weight of the specimens was measured and then it was completely immersed into the experimental solution at 90° C. After 6 h. the specimen, were taken out, washed thoroughly with distilled water, dried completely, and their final weights were measured. From the initial and final weights of the specimen, the weight loss in weights was calculated. The corrosion rate (CR) in mm/y and inhibitor efficiency ($\eta$%) of the inhibitors can be calculated using the formulas 1 and 2:

$$C_R = \frac{87.6 \times W}{ATD} \quad (1)$$

where W is weight loss in mg, A is area in cm$^2$, and D is density in gm/cm$^3$ (7.86).

$$\eta(\%) = \frac{C_R^o - C_R^i}{C_R^o} \times 100 \quad (2)$$

where $C_R^o$ and $C_R^i$ are corrosion rate in absence and presence of inhibitor formulations.

Electrochemical Studies

Electrochemical measurements were carried out using a three electrode cell assembly, in which N 80 steel, graphite rod and saturated calomel are used as working, counter and reference electrodes, respectively. All the experiments were performed under static conditions using GamryPotentiostat/Galvanostat (Model G-300) instrument, and Gamry Echem Analyst 5.5 software was used for data analysis. Before each electrochemical experiment the working electrode was immersed in the test solution for 30 min, in order to attain a stable open circuit potential.

The electrochemical impedance experiments were carried out at the open circuit potential (OCP) in the frequency range from 105 to 10-2 Hz using AC signal of amplitude 10 mV peak to peak.

Potentiodynamic polarization was carried out by changing the potential from −250 mV to +250 mV vs OCP at a constant sweep rate of 1 mV/s.

Quantum Chemical Study

Density functional theory (DFT) is the most commonly used technique for predicting the chemical reactivity of inhibitor molecules. In the present case, all quantum chemical studies have been carried out with the help of DFT/B3LYP methods using 6-31G basis set for geometrical optimizations using Gaussian 09 program package. See Frisch M. J., et al., Gaussian 09, Revision A.02, Gaussian Inc., Wallingford CT, 2016—incorporated herein by reference in its entirety. It is well known that the corrosion process undergoes in the aqueous phase, so it is computationally suitable to include the effect of solvent and thus all quantum calculations were carried out in aqueous phase using self-consistent reaction field (SCRF) theory, with polarized continuum model (PCM). Quantum chemical parameters associated with the energies are the highest occupied molecular orbital (EHOMO), the lowest unoccupied molecular orbital (ELUMO) and the energy gap ($\Delta E$=ELUMO-EHOMO) have been calculated.

Results and Discussion

Effect of Concentration

Figure 2:
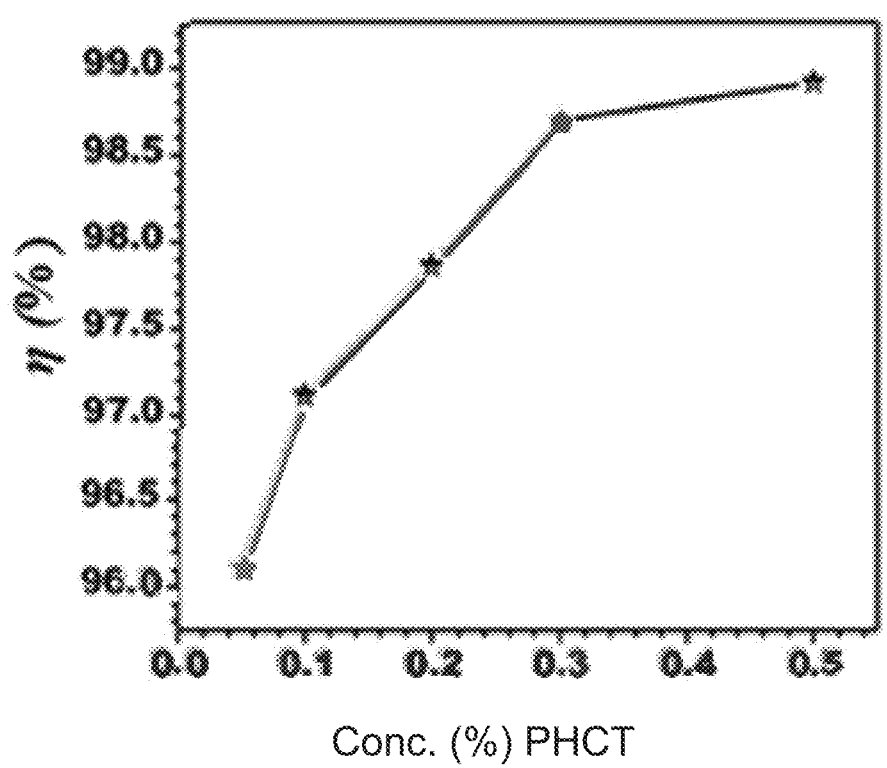
FIG. 2 is a graph illustrating the effect of PHCT inhibitor concentration on the inhibition efficiency.
Figure 3:
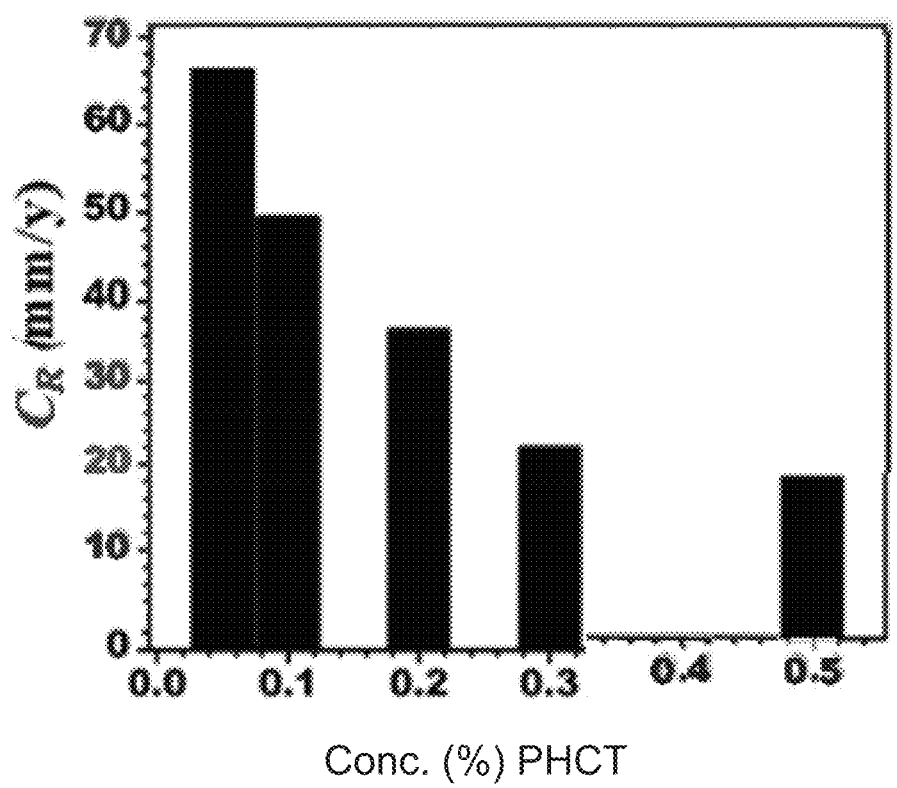
FIG. 3 is a graph illustrating the effect of PHCT inhibitor concentration on the corrosion rate (mm/y)

The effect of inhibitor concentration on the inhibition efficiency ($\eta$%) and corrosion rate (CR) are shown in FIG. 2 and FIG. 3. As per the figures the values of the inhibition efficiency increases and corrosion rate decreases with increase in the inhibitor concentration respectively. The decrease in corrosion rate and increases in inhibition efficiency with increase in inhibitor concentration is due to the adsorption of inhibitor molecules on the metal surface, which causes the reduction of metal dissolution.

Effect of Some Formulating Additives

To enhance the performance of synthesized compound, the effect of some additives, claimed to be of beneficial action on corrosion inhibitors in the acidizing treatments has been investigated [M. Finsgar, J. Jackson, Application of corrosion inhibitors for steels in acidic media for the oil and gas industry: A review, Corr. Sci. 86, 2014, 17; A. Singh, M. A. Acidizing Corrosion Inhibitors: A Review, Sci. 6, 2015, 224—each incorporated herein by reference in its entirety]. The tested additives are as follows: potassium iodide (KI), sodium chloride (NaCl) and sodium dodecyl sulfate (SDS).

The results of variation of corrosion rate and inhibition efficiency with the addition of additives are given in Table 1. The results of Table 1 show that all the tested additives have more than 95% of inhibition efficiency. The value of maximum inhibition efficiency and minimum corrosion rate are 99.06% and 16.00 mm/y, respectively, for Example 2.

TABLE 1

Effect of additives on the corrosion inhibition performance of PHCT on N80 steel in 15% HCl for 6 h at 90° C.

| Example | System | Inhibition efficiency ($\eta$ %) | Corrosion rate (mm/y) |
|---|---|---|---|
| Blank | 15% HCl | — | 1704.48 |
| Example 2 | 0.05 wt % PHCT + 0.25% KI + 0.10% SDS + 10 vol. % acetone | 99.06 | 16.00 |
| Example 3 | 0.05 wt % PHCT | 96.11 | 66.31 |
| | 0.1 wt % PHCT | 97.10 | 49.39 |
| | 0.2 wt % PHCT | 97.85 | 36.63 |
| | 0.3 wt % PHCT | 98.68 | 23.13 |
| | 0.5 wt % PHCT | 98.90 | 18.68 |

TABLE 1-continued

Effect of additives on the corrosion inhibition performance of PHCT on N80 steel in 15% HCl for 6 h at 90° C.

| Example | System | Inhibition efficiency ($\eta$ %) | Corrosion rate (mm/y) |
|---|---|---|---|
| Example 4 | 0.05 wt % PHCT + 0.25 wt % KI + 0.10 wt % SDS + 10 vol. % ethyl alcohol | 97.75 | 38.30 |
| | 0.05 wt % PHCT + 0.25 wt % KI + 0.10 wt % SDS + 5 wt % ethyl alcohol + 5 vol. % acetone | 98.18 | 31.08 |
| | 0.05 wt % PHCT + 0.25% KI + 0.10 wt % SDS + 10 vol. % acetone | 99.06 | 16.00 |
| Example 5 | 0.05 wt % PHCT + 0.10 wt % SDS + 0.25 wt % NaCl + 10 vol. % acetone | 98.40 | 27.20 |
| Example 6 | 0.05 wt % PHCT + 0.10 wt % SDS + 0.10% KI + 10 vol. % acetone | 97.74 | 38.49 |
| | 0.05 wt % PHCT + 0.10 wt % SDS + 0.25% KI + 10 vol. % acetone | 99.06 | 16.00 |
| | 0.05% PHCT + 0.10 wt % SDS + 0.50 wt % KI + 10 vol. % acetone | 99.02 | 16.75 |
| Example 7 | 0.05 wt % PHCT + 0.05 wt % SDS + 0.10 wt % KI + 10 vol. % acetone | 98.10 | 32.33 |
| | 0.05 wt % PHCT + 0.25 wt % KI + 0.10 wt % SDS + 10 vol. % acetone | 99.06 | 16.00 |
| | 0.05 wt % PHCT + 0.15 wt % SDS + 0.10 wt % KI + 10 vol. % acetone | 98.85 | 19.68 |
| Propargyl alcohol | 0.1 wt % | 12.22 | 1496.19 |
| | 0.2 wt % | 23.81 | 1298.64 |
| | 0.3 wt % | 88.09 | 203 |
| | 0.4 wt % | 90.59 | 162 |
| | 0.5 wt % | 97.47 | 43 |

Evaluation of Commercial Inhibitors

Figure 4:
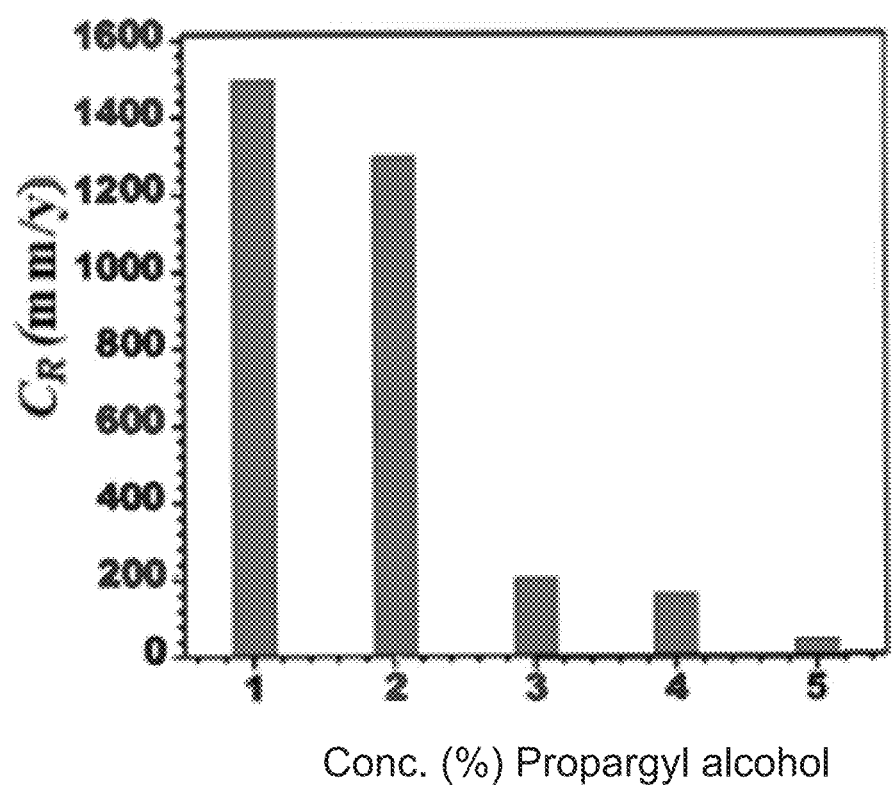
FIG. 4 is a graph illustrating the variation of corrosion rate (CR) with different concentrations of propargyl alcohol.
Figure 5:
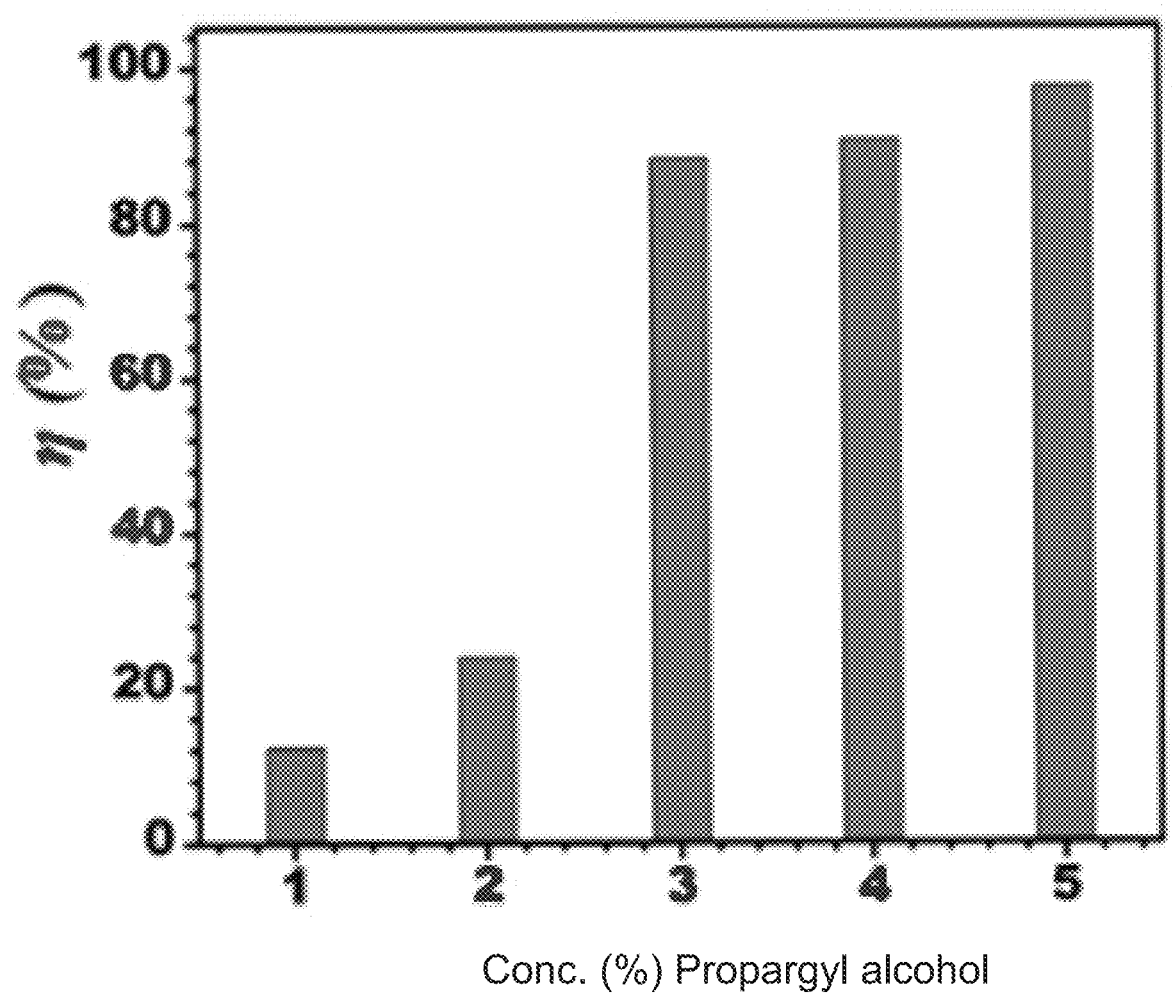
FIG. 5 is a graph illustrating the variation of inhibition efficiency (η%) with different concentrations of propargyl alcohol.

In the petroleum industry, propargyl alcohol is a commonly used acidizing inhibitor. So, the present invented formulation (Example 2) was compared with the commercially used propargyl alcohol under the same experimental conditions. FIGS. 4 and 5 show the variation of the corrosion rate and inhibition efficiency with different concentrations of propargyl alcohol. The maximum inhibition efficiency values obtained are given in Table 2 compared with the result given by PHCT formulation (Example 2).

The results of Table 2 show that the developed formulation (Example 2) is nearly three times more effective than propargyl alcohol in terms of corrosion rate.

TABLE 2

Comparison of propargyl alcohol at its optimum concentration with PHCT formulation (Example 2)

| Inhibitor | Corrosion rate (mm/y) |
|---|---|
| PHCT formulation (example 2) | 16.00 |
| Propargyl alcohol | 43 |

Adsorption Isotherm

In acidic solution, the adsorption of the inhibitor molecule is governed by the quasi-substitution process between the adsorbed water molecules on the metal surface and the inhibitor in the aqueous phase. The reaction can be representing as follows:

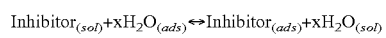

$$\text{Inhibitor}_{(sol)} + x\text{H}_2\text{O}_{(ads)} \leftrightarrow \text{Inhibitor}_{(ads)} + x\text{H}_2\text{O}_{(sol)}$$

See D. K. Yadav, B. Maiti, M. A. Quraishi, Electrochemical and quantum chemical studies of 3,4-dihydropyrimidin-2 (1H)-ones as corrosion inhibitors for mild steel in hydrochloric acid solution. Corros. Sci. 52, 2010, 3586—incorporated herein by reference in its entirety.

Figure 6:
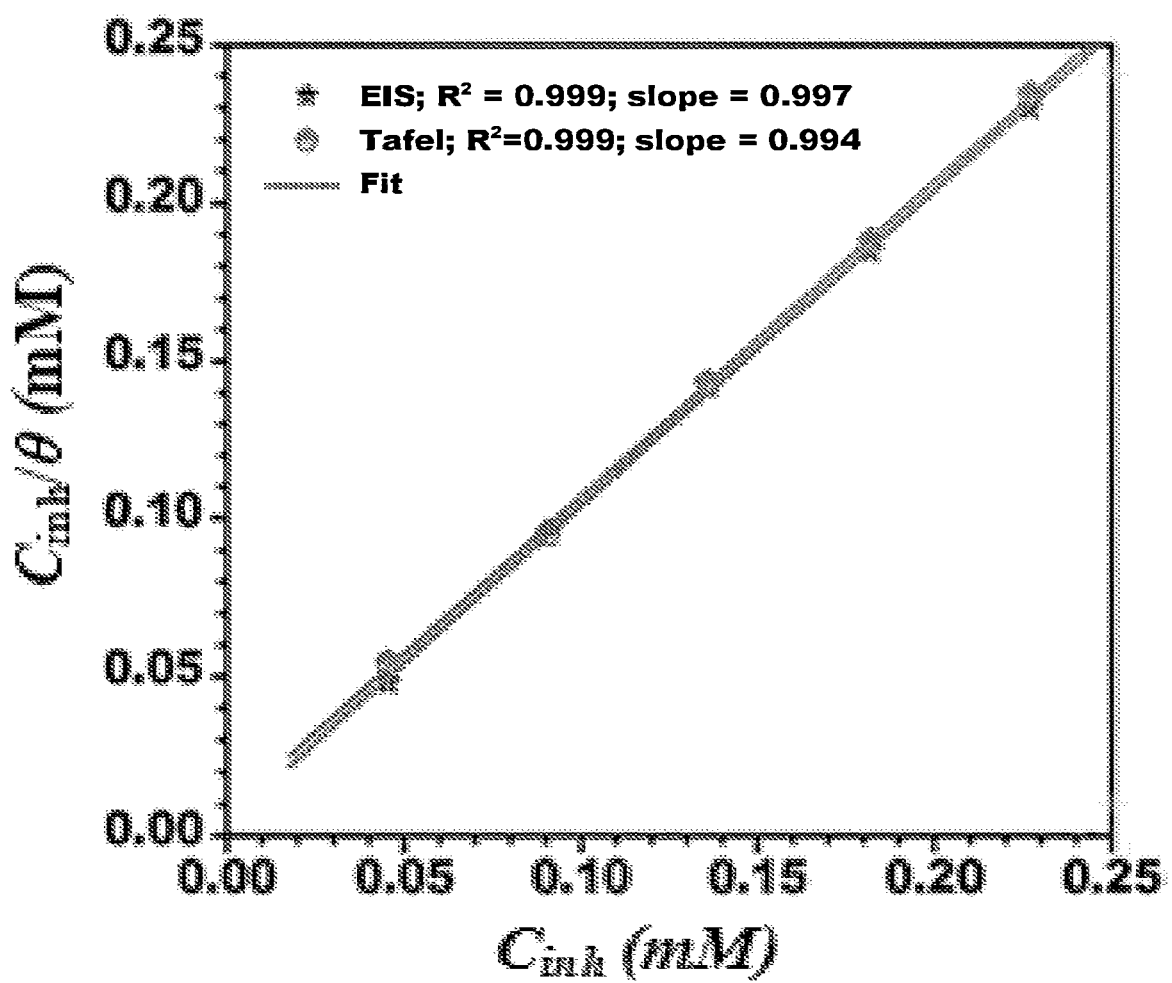
FIG. 6 is a graph illustrating Langmuir's isotherm plots for adsorption of PHCT inhibitor on N80 steel surface in 15% HCl.

Here, x represents the number of water molecules replaced by one inhibitor molecule. To obtain the isotherm, a linear function of different values of the θ and inhibitor concentration ($C_{inh}$) is plotted using the inhibition efficiency values obtained from EIS and Tafel data. Langmuir adsorption isotherm was found to be the best fit. The linear relationships of $C_{inh}/θ$ vs $C_{inh}$ represents the Langmuir isotherm and is shown in FIG. 6.

The plot yielded a straight line with a correlation coefficient ($R^2$) and slope values are close to 1. The Langmuir adsorption isotherm can be given by the below equation:

$$\frac{C_{inh}}{\theta} = \frac{1}{K_{ads}} + C_{inh} \tag{3}$$

where C is the inhibitor concentration, $K_{ads}$ is the adsorptive equilibrium constant and θ is the surface coverage. See K. R. Ansari, M. A. Quraishi, Experimental and quantum chemical evaluation of Schiff bases of isatin as a new and green corrosion inhibitors for mild steel in 20% $H_2SO_4$, J. Taiwan Inst. Chem. Eng. 54, 2015, 145—incorporated herein by reference in its entirety. $K_{ads}$ value is calculated from the intercepts of the straight line. From $K_{ads}$ value $\Delta G^0_{ads}$ value is calculated by the following equation:

$$\Delta G_{ads}^0 = -2.303RT \log(55.5 K_{ads}) \tag{4}$$

where, R is the gas constant and T is the absolute temperature. See Fekry, A. M. Mohamed, R. R. Acetyl, Thiourea Chitosan as an Eco-friendly Inhibitor for Mild Steel in Sulphuric Acid Medium. Electrochim. Acta 55, 2010, 1933—incorporated herein by reference in its entirety. The value of 55.5 is the concentration of water in solution in mol $L^{-1}$. The calculated values of $K_{ads}$ are $2.38 \times 10^5$ (EIS) and $1.35 \times 10^5$ (Tafel). The values of $-\Delta G^0_{ads}$ 42.00 kJ/mol (EIS) and 40.54 kJ/mol (Tafel). Generally, values of $\Delta G^0_{ads}$ up to $-20$ kJ $mol^{-1}$ indicate physical adsorption, while those less than $-40$ kJ $mol^{-1}$ indicate chemical adsorption. See D. K. Yadav, M. A. Quraishi, Application of Some Condensed Uracils as Corrosion Inhibitors for Mild Steel: Gravimetric, Electrochemical, Surface Morphological, UV—Visible, and Theoretical Investigations. Ind. Eng. Chem. Res. 51, 2012, 14966—incorporated herein by reference in its entirety. The calculated values of $\Delta G^0_{ads}$ are more than $-40$ kJ $mol^{-1}$. This indicated that chemical adsorption of inhibitor molecules occurred on metal surface.

Electrochemical Study Impedance Study
Electrochemical Impedance Spectroscopy (EIS)

Figure 7A:
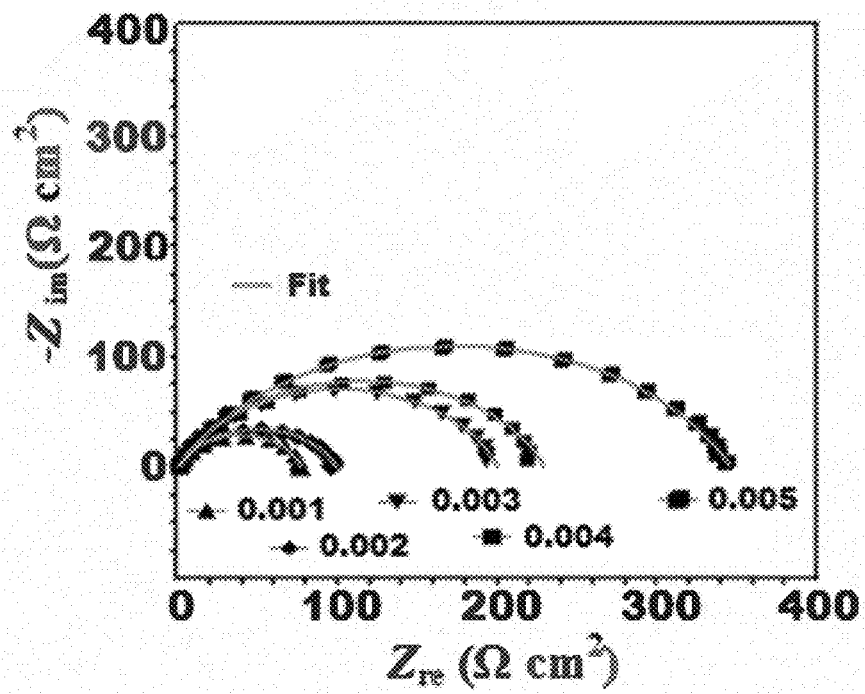
FIGS. 7A and 7B illustrate Nyquist plots for N80 steel in 15% HCl in the presence of different concentrations of PHCT inhibitor at 308 K (FIG. 7A) and in the absence of inhibitor (FIG. 7B)
Figure 7B:
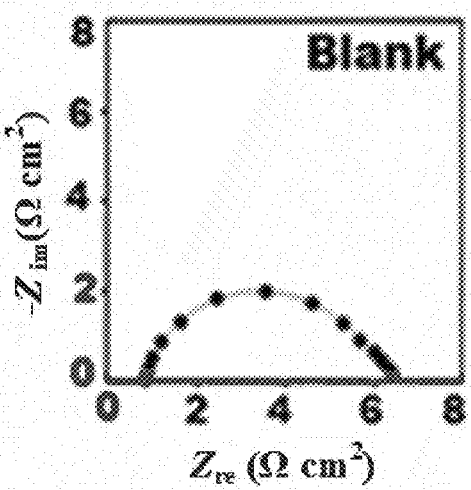

The kinetics occurring at the surface of the electrode and properties of the corroding system can be studied by electrochemical impedance spectroscopy. The fitted Nyquist plots in the presence and absence of different concentration of inhibitor at 308 K temperature are shown in FIGS. 7A and 7B, respectively.

It can be observed from the figure that all the impedance spectra both in absence and presence of different concentration of inhibitor only have a single capacitive loop and their shapes are almost similar. This suggests that addition of inhibitor causes no change in the mechanism of corrosion, and inhibition is mainly controlled by charge transfer process. See M. S. Nooshabadi, M. Ghandchi, Santolina chamaecyparissus extract as a natural source inhibitor for 304 stainless steel corrosion in 3.5% NaCl. J. Ind. Eng. Chem., 31, 2015, 231—incorporated herein by reference in its entirety. Also the diameter of the semicircular loop increases with increase in inhibitor concentrations, which is due to the formation of the inhibitor film barrier onto the metal surface.

Figure 8:
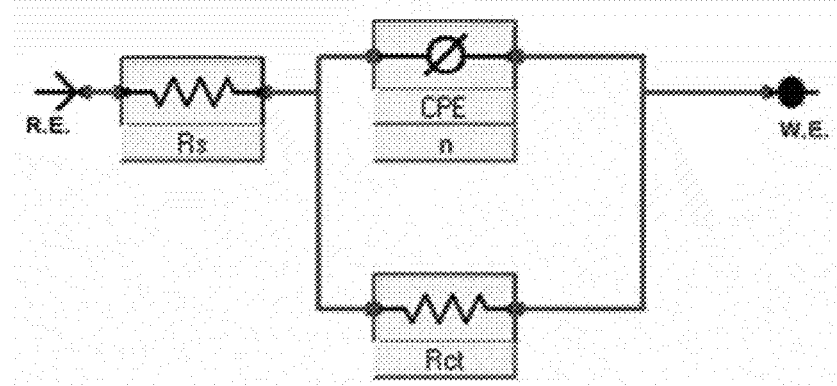
FIG. 8 illustrates the equivalent circuit model used to fit the EIS data.

The equivalent circuit used to fit the impedance data is presented in FIG. 8. The corresponding electrochemical parameters are tabulated in Table 3.

TABLE 3

Electrochemical impedance parameters for N80 steel in 15% HCl in absence and presence of different concentrations of PHCT at 308K

| $C_{inh}$ (%) | $R_s$ (Ω) | $R_{ct}$ (Ω) | n | $Y_0$ (μF/cm$^2$) | $C_{dl}$ (μF/cm$^2$) | η (%) |
|---|---|---|---|---|---|---|
| Blank | 0.82 | 5.40 | 0.722 | 603 | 134.24 | — |
| 0.001 | 0.509 | 77.03 | 0.748 | 168 | 45.70 | 94.05 |
| 0.002 | 0.526 | 99.07 | 0.755 | 130.3 | 43.10 | 95.37 |
| 0.003 | 0.532 | 118.16 | 0.758 | 117.2 | 41.60 | 96.12 |
| 0.004 | 0.452 | 230.04 | 0.807 | 62.96 | 29.71 | 98.00 |
| 0.005 | 0.509 | 313.49 | 0.868 | 45.58 | 27.80 | 98.53 |

The metal/acid interface surface is not behaving as real capacitor so that in the equivalent circuit capacitor has been substituted by constant phase element and CPE is expressed as follows:

$$Z_{CPE} = Y_0^{-1}(i\omega)^{-n} \tag{5}$$

where $Y_0$ is the CPE magnitude, ω is the angular frequency, i is the imaginary number and n is an empirical exponent which measures the heterogeneity of the metal surface. See Z. B. Stoynov, B. M. Grafov, B. Savova-Stoynova, V. V. Elkin, Electrochemical Impedance, Nauka, Moscow, 1991—incorporated herein by reference in its entirety. The double layer capacitance is calculated from the CPE value by the following equation:

$$C_d = (Y_0 R_{ct}^{1-n})^{1/n} \tag{6}$$

See A. Popova, E. Sokolova, S. Raicheva, M. Christov, AC and DC study of the temperature effect on mild steel corrosion in acid media in the presence of benzimidazole derivatives. Corros. Sci. 45, 2003, 33—incorporated herein by reference in its entirety.

Inhibition efficiency was calculated from charge transfer resistance ($R_{ct}$) values using the following formula:

$$\eta \% = \left(1 - \frac{R_{ct}}{R_{ct(i)}}\right) \times 100 \tag{7}$$

where, $R_{ct}$ and $R_{ct(i)}$ are the charge transfer resistance in the absence and presence of inhibitors respectively. From Table 3, it can be observed that the values of $R_{ct}$ is increased in presence of inhibitors as compared to the blank, which is due the increase in surface covered by the inhibitors molecules and intern causes reduction in metal dissolution. See K. I. Kabel, K. Zakaria, M. A. Abbas, E. Khamis, Assessment of corrosion inhibitive behavior of 2-aminothiophenol derivatives on carbon steel in 1 M HCl. J. Ind. Eng. Chem., 23, 2015, 57—incorporated herein by reference in its entirety. However, the values of $C_{dl}$ were decreased in with increase in the concentration of the inhibitor as compared to the blank, which suggests that a double layer has been formed at the metal/solution interface. See H. Bouammali, C. Jama, K. Bekkouch, A. Aouniti, B. Hammouti, F. Bentiss, Anti-corrosion potential of diethylenetriaminepentakis (methylphosphonic) acid on carbon steel in hydrochloric acid solution. J. Ind. Eng. Chem., 26, 2015, 270—incorporated herein by reference in its entirety. Thus, adsorption of inhibitors molecules over the metal surfaces leads to the displacement of the pre-absorbed water molecules and thus decreases the electrical capacity of the metal surface.

Potentiodynamic Polarization

Figure 9:
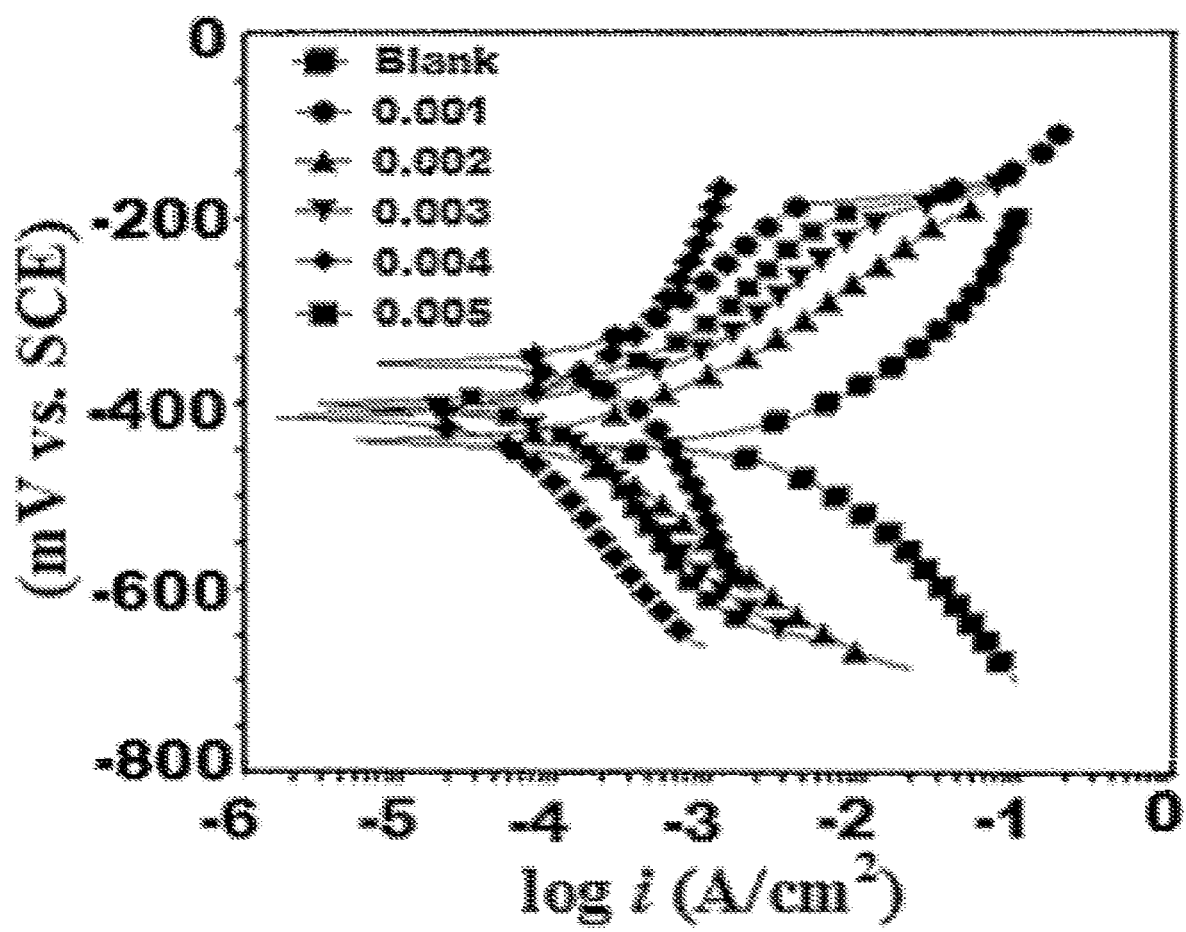
FIG. 9 illustrates Tafel curves for N80 steel in 15% HCl. in absence and presence of different concentrations of PHCT inhibitor at 308 K.

The corrosion kinetics of cathodic and anodic reactions in 15% HCl in absence and presence of different concentration of inhibitor on N80 steel at 308 K is shown in FIG. 9. Inspection of the figure indicates that both the anodic and cathode curves are shifted towards the lower current portion in the presence of different concentrations of inhibitor as compared to the blank. This is due to the adsorption of inhibitor, which causes corrosion mitigation of both anodic and cathodic reactions. The data of some electrochemical kinetics parameters are tabulated in Table 4.

TABLE 4

Potentiodynamic polarization parameters for N80 steel in 15% HCl in absence and presence of different concentrations of PHCT at 308K

| Inhibitor (%) | $E_{corr}$ (mV/SCE) | $i_{corr}$ (μA/cm$^2$) | $\beta_a$ (mV/dec) | $-\beta_c$ (mV/dec) | η (%) |
|---|---|---|---|---|---|
| Blank | −443 | 3201 | 85.7 | 100.8 | — |
| 0.001 | −356 | 520 | 92.8 | 372 | 83.75 |
| 0.002 | −439 | 152 | 82.6 | 337.2 | 95.25 |
| 0.003 | −406 | 142 | 83.7 | 327.8 | 95.56 |
| 0.004 | −399 | 112 | 100.7 | 338 | 96.50 |
| 0.005 | −414 | 89 | 136.7 | 372.6 | 97.21 |

The inspection of Table 4 reveals that the corrosion current density ($i_{corr}$) in the presence of 0.005 wt. % concentration of inhibitor is quite a bit less (89 μA/cm$^2$) as compared to the blank (3201 μA/cm$^2$), indicating that the inhibitor has adsorbed on N80 steel/solution interface and reduces the corrosion process. Using the $i_{corr}$ values, inhibition efficiency was calculated:

$$\eta \% = \left(1 - \frac{i_{corr(i)}}{i_{corr}}\right) \times 100 \qquad (8)$$

where, $i_{corr}$ and $i_{corr(i)}$ are the uninhibited and inhibited corrosion current densities, respectively. See A. Singh, K. R. Ansari, J. Hague, P. Dohare, H. Lgaz, R. Salghi, M. A. Quraishi, Effect of electron donating functional groups on corrosion inhibition of mild steel in hydrochloric acid: Experimental and quantum chemical study, J. Taiwan Inst. Chem. Eng. 82, 2018, 233—incorporated herein by reference in its entirety.

Table 4 also reveals that the values of anodic Tafel constant ($\beta_a$) and the cathodic Tafel constants ($\beta_c$) in the absence and presence of different concentration of inhibitor are almost the same, suggesting that the addition of inhibitor does not cause the modification of the corrosion mechanism i.e. oxidation of metal into metal ion (metal dissolution) in anodic reactions and conversion of H$^+$ ion into H$_2$ gas (hydrogen evolution) in cathodic reactions. Thus, the inhibitor is said to be mixed type.

Quantum Chemical Calculation

Neutral Form of PHCT and Propargyl Alcohol

Figure 10:
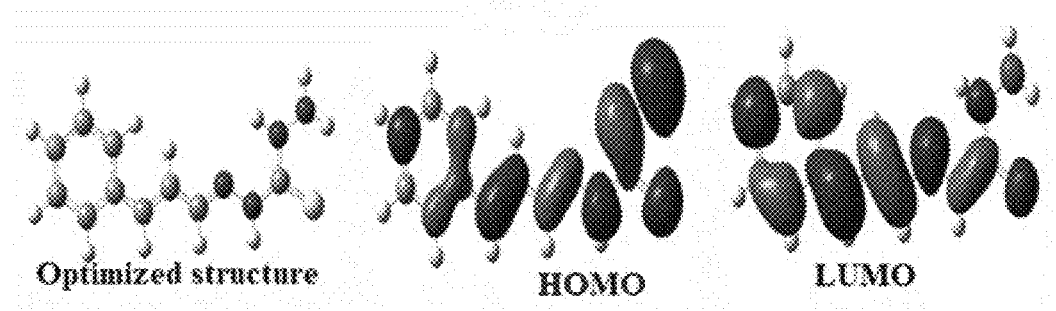
FIG. 10 illustrates the optimized structure, HOMO and LUMO distribution of a neutral PHCT molecule.
Figure 12:
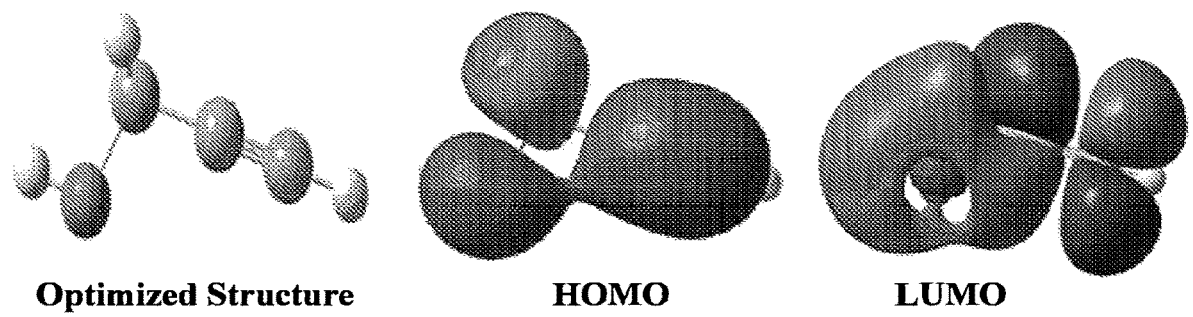
FIG. 12 illustrates the optimized structure, HOMO and LUMO distribution of a neutral propargyl alcohol molecule.

In order to study the chemical reactivity of both synthesized compound (PHCT) and commercially used propargyl alcohol, the analysis of the energy of highest occupied molecular orbital ($E_{HOMO}$), the energy of the lowest unoccupied molecular orbital ($E_{LUMO}$) and energy gap (ΔE) between them has been studied. The optimized structures, HOMO and LUMO distribution of invented inhibitor molecule (PHCT) and propargyl alcohol and are shown in FIGS. 10 and 12. According to the FMO theory, $E_{HOMO}$ is associated to the capability of a molecule to donate electron to the favorable acceptor molecule having vacant orbitals. So, a molecule with higher $E_{HOMO}$ values would exhibit a higher capability to donate electrons to vacant metal orbital, and thus facilitate the inhibitor molecules to strongly adsorb onto the metal surface and act as a good inhibitor. See N. O. Obi-Egbedi, I. B. Obot, Inhibitive properties, thermodynamic and quantum chemical studies of alloxazine on mild steel corrosion in H$_2$SO$_4$, Corros. Sci. 53, 2011, 263— incorporated herein by reference in its entirety. On other side, $E_{LUMO}$ is associated with the electron accepting capability of the inhibitor molecules. Hence, lower values of $E_{LUMO}$ facilitate acceptance of electrons from metal surface and promoting strong bonding between metal and inhibitor. See G. Gece, The use of quantum chemical methods in corrosion inhibitor studies, Corros. Sci. 50, 2008, 2981— incorporated herein by reference in its entirety. From Table 5, it is clear that PHCT has higher value of $E_{HOMO}$ and lower value of $E_{LUMO}$ and thus shows high inhibition efficiency as compared to propargyl alcohol.

The energy gap (ΔE=$E_{LUMO}$−$E_{HOMO}$) is another important quantum chemical parameter which determines the adsorption behavior of the inhibitor molecules. As the value of ΔE decreases, the reactivity of the inhibitor molecules increases; this increases the adsorption ability of the inhibitors over the metal surface. See N. O. Obi-Egbedi, I. B. Obot, Inhibitive properties, thermodynamic and quantum chemical studies of alloxazine on mild steel corrosion in H$_2$SO$_4$, Corros. Sci. 53, 2011, 263—incorporated herein by reference in its entirety. The present invented inhibitor molecule (PHCT) has lower value of ΔE as compared to propargyl alcohol (Table 5). Thus, PHCT exhibits higher inhibition efficiency than propargyl alcohol.

TABLE 5

Calculated quantum chemical parameters of PHCT and propargyl alcohol

| Inhibitor | $E_{HOMO}$ (eV) | $E_{LUMO}$ (eV) | ΔE (eV) |
|---|---|---|---|
| PHCT (neutral) | −5.033 | −1.837 | 3.196 |
| PHCT (protonated) | −5.753 | −2.188 | 3.565 |
| Propargyl alcohol(neutral) | −7.220 | 0.687 | 7.907 |
| Propargyl alcohol(protonated) | −8.332 | −1.179 | 7.153 |

Protonated Form of PHCT and Propargyl Alcohol

Figure 11:
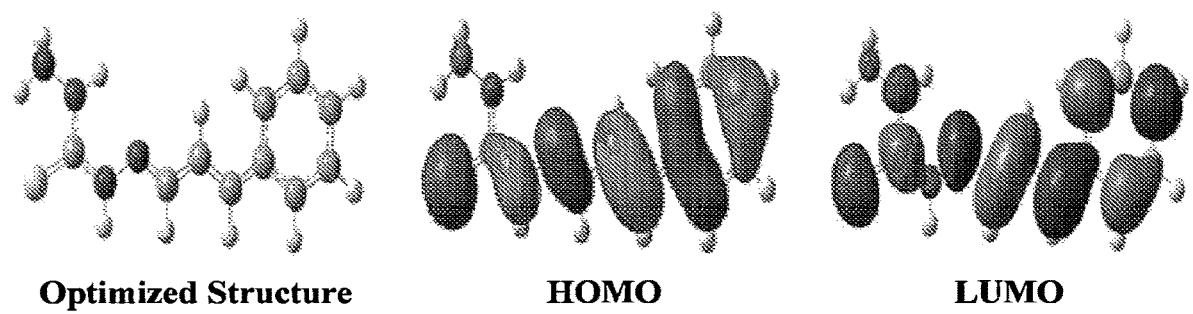
FIG. 11 illustrates the optimized structure, HOMO and LUMO distribution of a protonated PHCT molecule.
Figure 13:
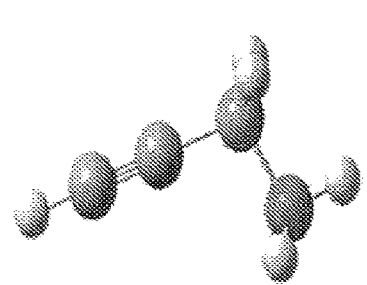
FIG. 13 illustrates the optimized structure, HOMO and LUMO distribution of a protonated propargyl alcohol molecule.
Figure 13:
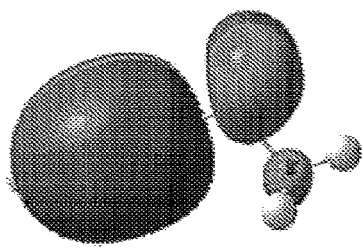
Figure 13:
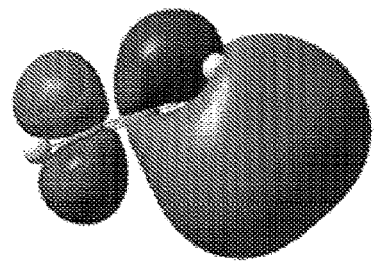

Heteroatoms having more negative values of Mulliken charge is likely to undergo protonation easily. The optimized structures, HOMO and LUMO distribution of protonated invented inhibitor molecule and propargyl alcohol and are shown in FIGS. 11 and 13.

An observation of Table 5 reveals that PHCT has higher value of $E_{HOMO}$ and lower value of $E_{LUMO}$ than propargyl alcohol after protonation and thus PHCT shows high inhibition efficiency as compared to propargyl alcohol. Also, after protonation the invented inhibitor molecule (PHCT) has lower value of ΔE as compared to propargyl alcohol (Table 5) This also supports that PHCT exhibits higher inhibition efficiency than propargyl alcohol.

Thus, (i) the tested inhibitor can be used in the acidizing treatment of the oil wells; (ii) the inhibitor formulation gives 3 times lesser corrosion rate than commercially used propargyl alcohol; (iii) the inhibitor follows the Langmuir adsorption isotherm; (iv) the values of $\Delta G^0_{ads}$ obtained from of EIS and Tafel study support the chemical nature of inhibitor adsorption; (v) potentiodynamic polarization study confirmed that inhibitor is mixed type; (vi) EIS studies revealed that $R_{ct}$ values increased and $C_{dl}$ values decreased; and (vii) quantum chemical calculation reveals that invented inhibitor (PHCT) is better inhibitor than propargyl alcohol.

The invention claimed is:

1. A method of inhibiting corrosion of metal during acid stimulation of an oil and gas well, the method comprising:
 treating the oil and gas well with an acidic treatment fluid comprising based on a total weight of the acidic treatment fluid:
 from 10 to 28 wt. % of an acid;
 from 0.001 to 0,045 wt. % of a corrosion inhibitor of formula I,

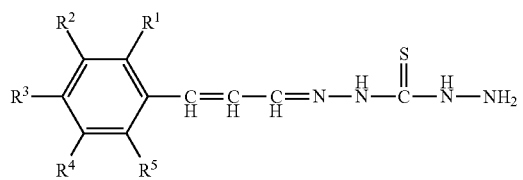

(I)

wherein $R^1$ to $R^5$ are hydrogen, and
from 0.01 to 15 wt. % of at least one secondary corrosion inhibitor of formula (II)

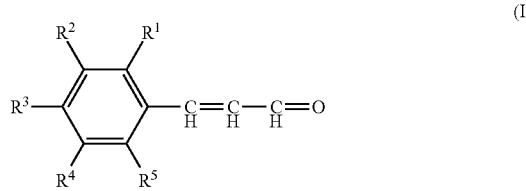

(II)

wherein $R^1$ to $R^5$ are independently hydrogen, an alkyl, an aryl, or an alkoxy, and
wherein the acidic treatment fluid is substantially free of an intensifier, a surfactant, an organic solvent and a dimeric reaction product obtained by a double condensation reaction between thiocarbohydrazide ($H_2N$—NH—C(S)—NH—$NH_2$) and two cinnamaldehyde compounds.

2. The method of claim 1, wherein the corrosion inhibitor of formula I is present in the acidic treatment fluid in a concentration of 0.002 to 0.005 wt. %, based on a total weight of the acidic treatment fluid.

3. The method of claim 1, wherein the acidic treatment fluid is an aqueous solution.

4. The method of claim 1, wherein the acid is HCl and wherein the acidic treatment fluid comprises 14 to 16 wt. % HO, based on a total weight of the acidic treatment fluid.

5. The method of claim 1, wherein the oil and gas well is treated with the acidic treatment fluid at a temperature of 25 to 180° C.

6. The method of claim 1, wherein the metal is carbon steel.

7. The method of claim 1, which has a corrosion inhibition efficiency of 80 to 99.5%.

8. The method of claim 1, wherein a corrosion rate of the metal is from 16 to 100 millimeters per year (molly) when exposed to 15 wt. % of the acid at 90° C.

9. The method of claim 1, wherein the acidic treatment fluid is formed downhole by injecting the acid into the oil and gas well, followed by injecting the corrosion inhibitor of formula I and the at least one secondary corrosion inhibitor of formula (II) into the oil and gas well.

10. The method of claim 1, wherein the at least one secondary corrosion inhibitor of formula (II) is selected from the group consisting of cinnamaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde and 3,4-dimethoxycinnamaldehyde.

11. The method of claim 1, wherein the at least one secondary corrosion inhibitor of formula (II) is selected from the group consisting of 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, coniferyl aldehyde, 2,3-dimethoxy-4,5-methylenedioxycinnamaldehyde and 2-methoxy-4,5-methylenedioxy cinnamaldehyde.

12. The method of claim 1, wherein the at least one secondary corrosion inhibitor of formula (II) is selected from the group consisting of p-dimethylaminocinnamaldehyde, p-diethylamino-cinnamaldehyde, p-nitrocinnamaldehyde, o-nitrocinnamaldehyde, 3,4-methylenedioxy-cinnamaldehyde, p-trimethylammoniumcinnamaldehyde, p-thiocyanocinnamaldehyde and p-chlorocinnamaldehyde.

13. The method of claim 1, wherein the at least one secondary corrosion inhibitor of formula (II) is coniferyl aldehyde.

* * * * *